(12) United States Patent
Pfister

(10) Patent No.: US 8,959,798 B2
(45) Date of Patent: Feb. 24, 2015

(54) SHOE SOLE ELEMENT

(75) Inventor: Patrick Pfister, Oberwil ZH (CH)

(73) Assignee: Zurinvest AG, Zug (CH)

( * ) Notice: Subject to any disclaimer, the term of this patent is extended or adjusted under 35 U.S.C. 154(b) by 322 days.

(21) Appl. No.: 13/530,689

(22) Filed: Jun. 22, 2012

(65) Prior Publication Data
US 2012/0297641 A1    Nov. 29, 2012

Related U.S. Application Data

(63) Continuation-in-part of application No. 12/482,800, filed on Jun. 11, 2009, now Pat. No. 8,266,825.

(30) Foreign Application Priority Data

Jun. 11, 2008  (EP) ..................................... 08158076
Sep. 5, 2008  (EP) ..................................... 08163765

(51) Int. Cl.
| | |
|---|---|
| A43B 13/18 | (2006.01) |
| A43B 13/12 | (2006.01) |
| A43B 7/22 | (2006.01) |
| A43B 13/14 | (2006.01) |
| A43B 21/26 | (2006.01) |
| B29D 35/14 | (2010.01) |

(52) U.S. Cl.
CPC ................ *A43B 13/12* (2013.01); *A43B 7/223* (2013.01); *A43B 13/125* (2013.01); *A43B 13/127* (2013.01); *A43B 13/146* (2013.01); *A43B 21/26* (2013.01); *B29D 35/142* (2013.01)
USPC .......................................... 36/30 R; 36/25 R

(58) Field of Classification Search
USPC ................. 36/25 R, 30 R, 142–144
See application file for complete search history.

(56) References Cited

U.S. PATENT DOCUMENTS

| | | | |
|---|---|---|---|
| 3,512,274 A | 5/1970 | McGrath | |
| 4,030,213 A | 6/1977 | Daswick | |
| 4,183,156 A | 1/1980 | Rudy | |
| 4,241,523 A | 12/1980 | Daswick | |
| 4,271,606 A | 6/1981 | Rudy | |
| 4,348,821 A * | 9/1982 | Daswick | ......................... 36/103 |
| 4,372,059 A | 2/1983 | Ambrose | |
| 4,642,911 A * | 2/1987 | Talarico, II | ................... 36/30 R |
| 4,656,760 A | 4/1987 | Tonkel et al. | |
| 4,715,133 A | 12/1987 | Hartjes et al. | |

(Continued)

FOREIGN PATENT DOCUMENTS

| | | |
|---|---|---|
| DE | 202006007725 U1 | 10/2007 |
| EP | 1857006 A1 | 11/2007 |

(Continued)

*Primary Examiner* — Marie Bays
(74) *Attorney, Agent, or Firm* — The Webb Law Firm

(57) ABSTRACT

A midsole element to be mounted to the lower surface of an insole of a shoe as a heel, wherein the midsole element has a upper surface adapted to be mounted on the lower surface of the insole and a lower surface, wherein the midsole element comprises a core and a resilient compression element being softer than the core. The midsole element allows a pivoting movement of the upper surface of the midsole element against the lower surface of the midsole element in, at least, an essentially transverse direction to the longitudinal axis of the midsole element in a mounted state, wherein the core has a form of a rounded cone or sphere within the resilient compression element. The midsole element can also be mounted to the lower surface of a shoe under the forefoot portion, wherein the core has the form of a round ridge.

18 Claims, 20 Drawing Sheets

(56) References Cited

U.S. PATENT DOCUMENTS

| | | | |
|---|---|---|---|
| 4,757,620 A * | 7/1988 | Tiitola | 36/28 |
| 5,727,335 A * | 3/1998 | Kousaka et al. | 36/31 |
| 5,881,478 A * | 3/1999 | McMahon et al. | 36/144 |
| 6,098,313 A | 8/2000 | Skaja | |
| 6,487,796 B1 | 12/2002 | Avar et al. | |
| 6,708,424 B1 | 3/2004 | Ellis, III | |
| 6,782,639 B1 * | 8/2004 | Muller | 36/28 |
| 6,918,197 B2 | 7/2005 | Ellis, III | |
| 7,174,658 B2 | 2/2007 | Ellis, III | |
| 7,555,848 B2 | 7/2009 | Aveni et al. | |
| 7,647,710 B2 | 1/2010 | Ellis, III | |
| 7,676,956 B2 | 3/2010 | Dojan et al. | |
| 7,779,557 B2 * | 8/2010 | Teteriatnikov et al. | 36/25 R |
| 7,814,683 B2 | 10/2010 | Lee | |
| 7,832,118 B2 | 11/2010 | Holden et al. | |
| 7,886,460 B2 * | 2/2011 | Teteriatnikov et al. | 36/25 R |
| 7,941,940 B2 * | 5/2011 | Teteriatnikov et al. | 36/25 R |
| 8,266,825 B2 * | 9/2012 | Pfister | 36/30 R |
| 8,448,352 B2 * | 5/2013 | Ryu | 36/25 R |
| 2001/0052194 A1 | 12/2001 | Nishiwaki et al. | |
| 2003/0070322 A1 | 4/2003 | Masseron | |
| 2003/0131497 A1 | 7/2003 | Ellis, III | |
| 2004/0216330 A1 | 11/2004 | Swigart | |
| 2005/0022425 A1 | 2/2005 | Brown | |
| 2005/0217143 A1 | 10/2005 | Ellis, III | |
| 2005/0252038 A1 | 11/2005 | Braunschweiler | |
| 2006/0080862 A1 | 4/2006 | Hay et al. | |
| 2006/0156581 A1 | 7/2006 | Holden et al. | |
| 2007/0068046 A1 | 3/2007 | Mathieu et al. | |
| 2007/0175066 A1 | 8/2007 | Hann | |
| 2008/0110056 A1 | 5/2008 | Mann et al. | |
| 2008/0127515 A1 * | 6/2008 | Lohrer | 36/88 |
| 2008/0222917 A1 | 9/2008 | Dojan et al. | |
| 2009/0064539 A1 | 3/2009 | Park et al. | |
| 2010/0146819 A1 * | 6/2010 | Teteriatnikov et al. | 36/103 |
| 2011/0072690 A1 | 3/2011 | Teteriatnikov et al. | |

FOREIGN PATENT DOCUMENTS

| | | |
|---|---|---|
| EP | 1880626 A1 | 1/2008 |
| WO | 03103430 A1 | 12/2003 |
| WO | 2007030818 A2 | 3/2007 |

* cited by examiner

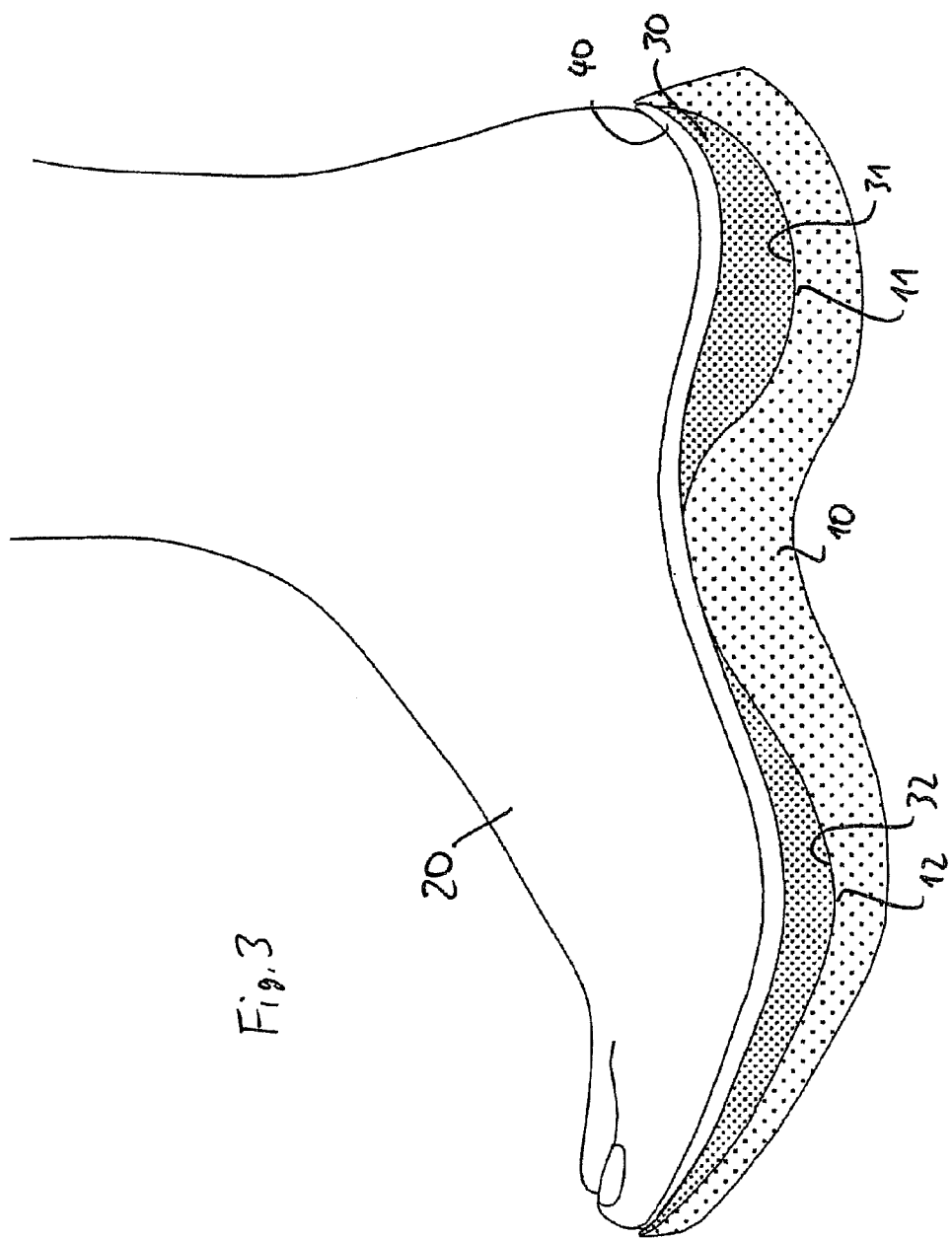

SHOE SOLE ELEMENT

CROSS REFERENCE TO RELATED APPLICATIONS

This application is a continuation-in-part of U.S. patent application Ser. No. 12/482,800, filed Jun. 11, 2009, which is hereby incorporated by reference.

BACKGROUND OF THE INVENTION

1. Field of the invention

The invention relates to a midsole element to be mounted separately on the heel portion and/or the forefoot portion of a shoe. This midsole element can also be provided for shoe repair services.

2. Description of the Related Art

Shoe soles having resilient properties are well known from prior art. In particular sport shoes are known to comprise air or gel cushions as shock absorption elements. Said elements provide good shock absorption, but the lack of guidance in terms of anatomical positions such as for example pronation or subpronation. Furthermore the limitation of the maximum degree of compensation is provided by the properties of the shock absorption elements, which can cause an uncontrollable compression leading to instable positions.

Further resilient elements or shock absorption elements are, for example, known from WO 2003/103430. This publication shows a plurality of concepts for providing a shoe sole with resilient properties. With such soles it is possible to compensate lateral anatomic position as named above.

The known soles provide good compensation around a longitudinal axis which extends in direction along the longitudinal direction of the foot from heel to toes. However, it is a drawback that the compensation is not guided and that the degree of the compensation is not very well adjustable.

Additionally the compensation around a lateral axis seems to be based on random and is also not very well guided.

WO 2007/030818 discloses a shoe, comprising an assembly of a shoe upper and a sole unit for supporting a foot, wherein the assembly defines a foot compartment and orients a foot in a specific desired angle for the alignment of the lower leg, to effect three areas of the foot anatomically.

EP 1 857 006 discloses a footwear sole, having a plurality of stud clusters, oriented in accordance with the predetermined direction of cross shear motion of the stud cluster, and each stud cluster is dimensioned in accordance with the distribution of forces applied to the sole during ground contact.

Furthermore, prior art as EP 1 880 626 discloses a shoe with a sole, to allow pivoting of the foot around a horizontally oriented axis, transverse to the longitudinal main direction of the foot.

DE 20 2006 007725 U1 discloses a shoe having an insole and an outsole, wherein the insole can be replaced. The insole of a shoe according to this document is less rigid than the outsole to enable a rolling movement of the feet of a user. This rolling movement is supported by the more rigid outsole which is thicker in the middle portion of the shoe.

U.S. Pat. No. 4,030,213 discloses a shoe having a rigid insole being in its middle portion with part of the sole touching the ground and having a resilient auxiliary outsole member provided within a front and a back portion. The thickness of both the rigid insole and the resilient outsole, as shown in a side view, are the same over the whole width of the shoe with the aim to support a front-to-back rolling movement of the shoe to accomplish a more effective weight distribution of the user's weight during running.

U.S. Pat. No. 4,348,821 for Daswick discloses a midsole for a shoe, consisting of a core formed from a stiff plastic material with limited resilience and a separately molded or cast resilient ground-engaging member formed from a highly resilient rubber material. This rubber material can be easily compressed to half of its original thickness. A central pedestal is formed within the core material over the entire breadth of the midsole. The ground-engaging member comprises a heel portion with increased thickness, whereas the core portion is uniformly flat at the heel. The highly resilient ground-engaging member is always provided separately below the core portion.

US 2006/0156581 for Holden et al. provides a two-part midsole comprising an inlay for a sole to enhance protection against landing impact. The two-part midsole comprises a resilient shock absorbing midsole body wherein the midsole body comprises an opening in the heel area and below the forefoot to accommodate an elastomeric pad, having improved shock absorbing properties, in each opening. The pads are intended to improve the function of the surrounding material and are of equivalent resilient nature.

Accordingly, Daswick teaches a midsole having a harder central pedestal provided over the entire breadth of a midsole and having a resilient material only underneath the harder core portion and Holden teaches the concept of an inlay only intended to improve the resilient nature of the surrounding midsole material for midsole elements. The art of record fails to teach a midsole element that applies the principle of pivoting instable movement to a shoe, especially in the heel and/or forefoot area.

SUMMARY OF THE INVENTION

The invention is based on the insight that an improved comfort and training for the foot can be obtained, if the foot is allowed to pivot, at least, around an essentially horizontally oriented longitudinal axis, i.e., an axis oriented along the longitudinal direction of the foot or shoe. Preferably, this movement is not only a pivoting movement around such an axis, but the axis comprises at least two points allowing for a rotation of the corresponding part of the foot around such a point. This is based on the insight that a foot has at least two weight conferring areas and therefore the longitudinal pivoting action in any such area can be completed with a transverse pivoting action, resulting in a rotation. The two rotational movements are not in contradiction with the definition of a longitudinal pivoting line since the foot of a human is not a rigid unit but comprises at least a heel zone and a ball zone.

These and other objects of the invention are reached with a midsole element having the features set forth in the claims.

A shoe according to the invention comprises a sole and an insole. The sole comprises an upper surface being in contact with the lower surface of the insole. The upper surface of the sole comprises at least two depressions being complementary with embossments provided on the lower surface of the insole, allowing a pivoting movement of the front and/or back portion of the insole against the lower outsole surface of the shoe in, at least, an essentially transverse direction to the longitudinal axis of the shoe, when the foot wearing the shoe is pivoted against the ground.

A shoe according to the invention is based on the insight that the weight of a person is distributed between the heel, the external ridges, and the ball of the foot. It is common knowledge that one of the best ways to look after its feet is to walk in wet sand. The shoe according to the invention creates a natural instability, like walking on wet sand, and therefore requires maintaining balance. This provides a good feeling, and the body has to react. The usual approach for sole and shoe design acknowledges the forward movement, and therefore enables a pivoting across a transverse axis of the shoe. The insole supports the longitudinal arch, and acts as an anti-shock pad for the feet.

However, even if someone is standing still, this is not a static position, but a dynamic process with automatically slow balancing movements of the feet, the legs, and the whole body, wherein approximately 75 percent of the weight is supported by the heel region, and approximately 25% or one quarter is on the ball of the foot.

A further object of the present invention is to provide an alternative shoe sole allowing compensation of misalignments due to the physical structure of the wearer in lateral as well as longitudinal direction. Furthermore, the shoe sole shall be provided with means that provide certain guidance for the wearer. Additionally, the shoe sole shall encourage the wearer to constant but limited activity in order to balance the current position which provides a constant training effect.

Furthermore, the shoe sole shall be mounted supplementary to a shoe, when the wearer wishes to use such a shoe.

There is disclosed a midsole element or shoe sole element to be mounted to the lower surface of an insole of a shoe such as, for example, the heel or under the forefoot portion. The insole has an upper surface on one side facing the upper material of the shoe and a lower surface on the other side. The midsole element has an upper surface facing the lower surface of the insole and a lower surface. The midsole element comprises a core and a resilient compression element being softer than the core, wherein the core is in connection with the insole and is covered by the compression element. The midsole element allows for a pivoting movement of the upper surface of the midsole element against the lower surface of the midsole element in, at least, an essentially traverse direction to the longitudinal axis of the midsole element in a mounted state. When the midsole element is to be mounted to the shoe as a heel, the core has the form of a rounded cone or sphere within the resilient compression element. When the midsole element is to be mounted under the forefoot portion, the core has the form of a rounded ridge within the resilient compression element, wherein the longitudinal axis of the rounded ridge is oriented essentially transverse to the longitudinal axis of the midsole.

Such a midsole element or sole element is attachable to any existing shoe. Preferably the midsole element will be glued to the insole of an existing shoe. Alternatively it may also be an integral part of a shoe sole. The use of a compression element and a hard core have the advantage that the user has to balance the position constantly which provides constant exercise.

Preferably the surface of the core is curved as viewed in longitudinal direction extending horizontal from heel to toe and in that the surface of the core is curved as viewed in lateral direction extending horizontal and orthogonal to the longitudinal direction. Such a structure provides several degrees of freedom which have to be compensated by the user.

The radius of the curved surface varies preferably in the longitudinal direction and/or in the lateral direction, such that the core has an elliptical form in its cross-section.

Alternatively, the radius of the curved surface is constant in the longitudinal direction and/or in the lateral direction, such that the core has the form of a segment of a circle in its cross-section.

The core and the compression element can be two separate parts which are connected together with a known material such as, for example, glue and the like. Alternatively, the core and compression element can be a single piece formed by a known method, such as, for example, an injection-molding production method.

The compression element can be covered by an outer sole opposite to the upper surface of the midsole. The compression element can be compressed to a degree of 60% to 75% of its original volume and the core can be compressed to a degree of 25% to 40% of its original volume on a given load. The compression of the compression element and the core can be linear from the beginning to the end of a compression phase or the compression of the compression element and core can be nonlinear from the beginning to the end of the compression phase. The midsole can include an additional sole providing with its upper surface, the intended contact area with the insole of the shoe.

The resilient compression element can be made of a foam material, such as a flexible polyurethane foam and the core can be made of cork.

Preferably the midsole element is arranged in the region of the heel of the shoe and/or in the region of the forefoot.

BRIEF DESCRIPTION OF THE DRAWINGS

The drawings will be explained in greater detail by means of a description of an exemplary embodiment, with reference to the following figures:

FIG. 3 shows a perspective view of the shoe according to FIG. 1 with the foot putting weight on the sole assembly;

DETAILED DESCRIPTION OF THE PREFERRED EMBODIMENTS

Figure 1:
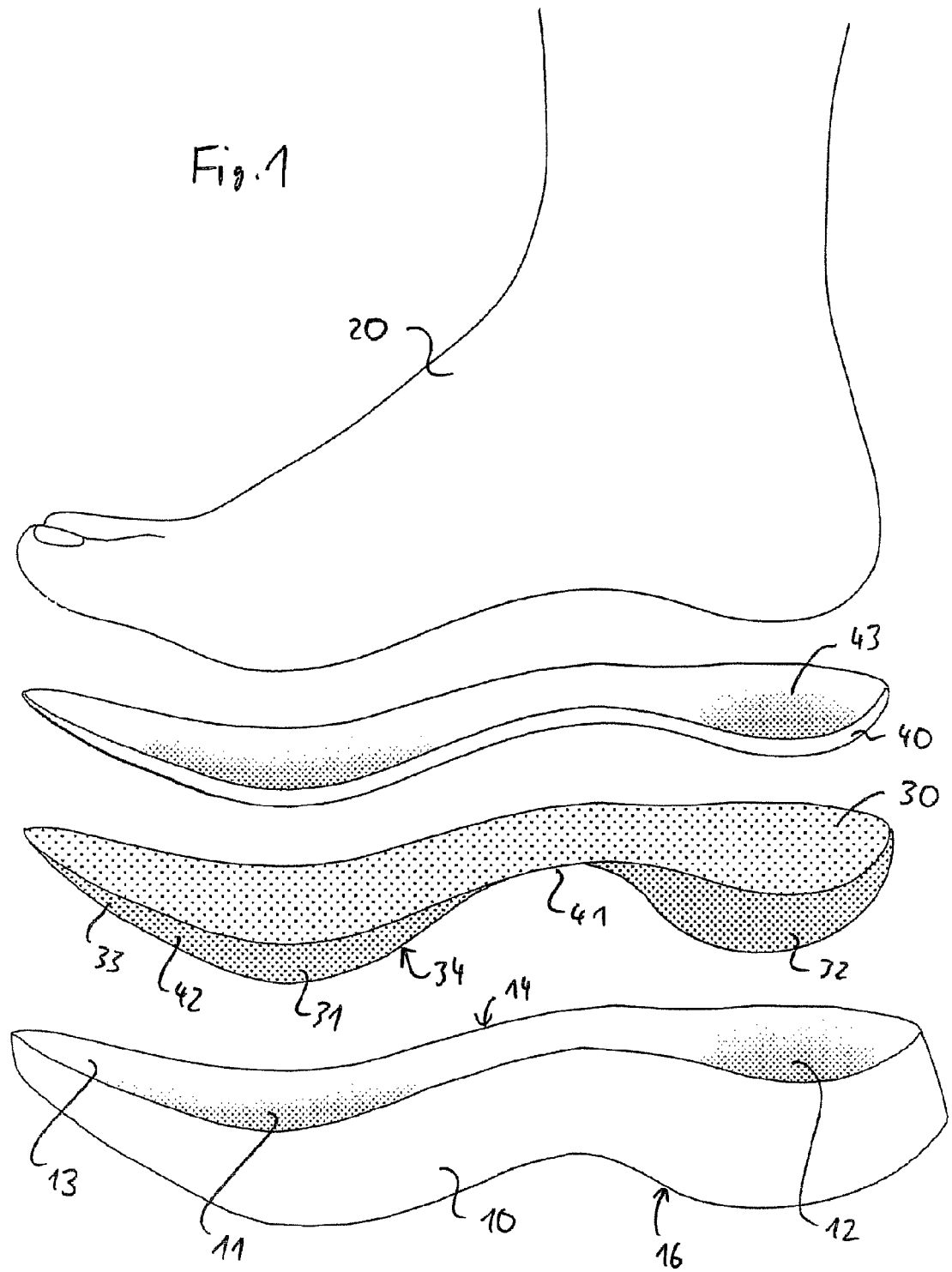
FIG. 1 shows an exploded schematical side view of the main components of the shoe, without showing an upper of the shoe.

FIG. 1 shows a schematical representation of an embodiment of the relevant parts of a shoe of the invention, together with the foot of a user to show the different relationships. The upper of the shoe is not shown. The upper can be chosen to suit the application of the shoe. This can be the form of a loafer, a basket shoe, a sneaker, a mid height shoe, a boot, with a shoe heel portion or with a flat lower sole.

Reference numeral 10 is provided to show the midsole, and/or outsole unit. The sole 10 can be the outsole, or be part of the outsole. The sole 10 can also comprise the midsole, the layer in between the outsole and the insole, which is typically used for shock absorption. It is relevant for the invention that the sole unit 10 comprises, within the portion which is oriented to the foot 20 of a user, at least two depressions 11 and 12, which can also be qualified as recesses. As it will be explained in connection with FIG. 8, the form of the recess 12 can be a rounded inverse cone, wherein the recess 11 can be a transverse oriented groove. Both recesses 11 and 12 can also have a form lying between a hollow inverse sphere portion and the form of the shown embodiments. Additionally, a front recess 13 can be provided, having an essentially more triangular form. The front recess 13 is arranged at the position of the toes.

Reference numeral 30 relates to the lower part of the insole. Preferably insole 30 and sole unit 10 are connected together, e.g., glued together, or made in one piece. It is possible that the insole comprises an extra insole 40, e.g., for controlling moisture of the sole or to give a structure to the sole. The upper surface of the extra insole 40, or if said insole is missing, the upper surface of insole 30, is shaped in an anatomical way, according to the foot 20 of a user. Therefore, someone skilled in the art can use any of the known configurations to design the surface 43 of the extra insole 40.

The lower part of the insole 30 comprises at least two embossments 31 and 32, and preferably a third front embossment 33. According to the teaching of the invention, the embossments 31 and 32 are complementary formed to the recesses 11 and 12, respectively. The same is true if the additional embossment 33 is provided facing the additional recess 13. Between the embossments 31 and 32 or 32 and 33 there are thinner transitional zones 41 and 42, respectively, connecting said embossments. In an embodiment comprising the extra insole 40, these zones 41 and 42 of the insole 30 can be omitted, and the embossments 31, 32 and 33 can be directly attached to the extra insole 40. However, it is preferred to provide the insole 30 in one single piece, comprising the different embossments 31, 32, and, if available, 33, as well as the transitional zones 41, and, if available, 42. In a simpler embodiment, the transitional zone 42 can be omitted, and the embossments 31 and 33 are creating one single thicker embossment. If the different embossments 31, 32, and, if available, 33 are provided as separated areas they can also be connected in one piece with sole 10.

It will be apparent from the further description, how the insole 30 is working together with the midsole 10.

Figure 2:
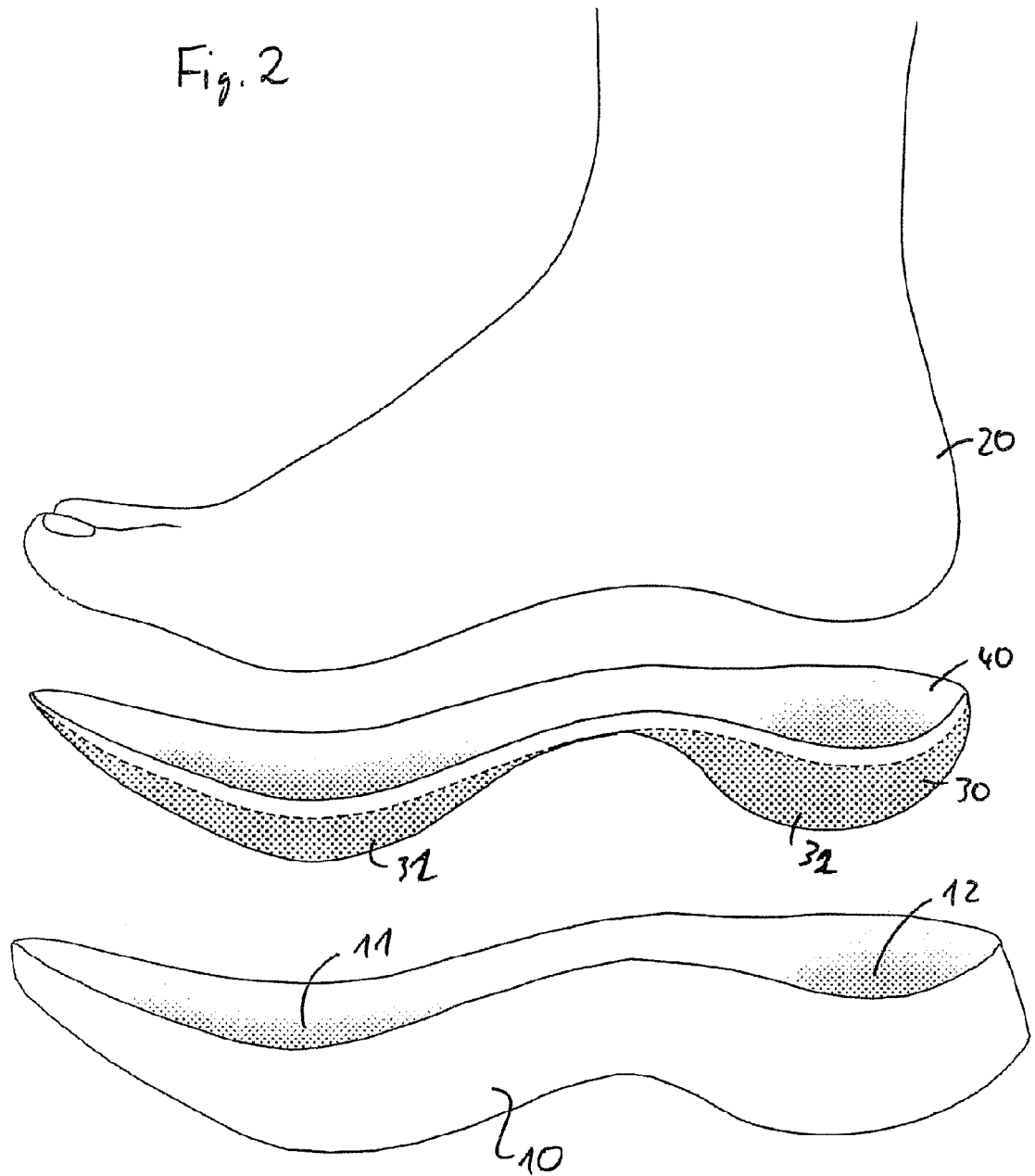
FIG. 2 shows a similar view to FIG. 1, wherein the insole and an extra insole is shown combined to one single item.

FIG. 2 shows the main parts of the invention, wherein the insole 30, as well as the extra insole 40, are combined in one insole, which is introduced into an upper (not shown) of a shoe, wherein the embossments 31 and 32 are positioned or connected non-detachably in the recesses 11 and 12.

FIG. 3 shows a further side view of a foot 20, engaging the sole part 10, 30 and 40 of the shoe. It can be seen from FIG. 3 that the complementary shape of recesses 11, 12 and embossments 31, 32 are in direct contact, e.g., in a way that the shoe is provided to the user.

Figure 4A:
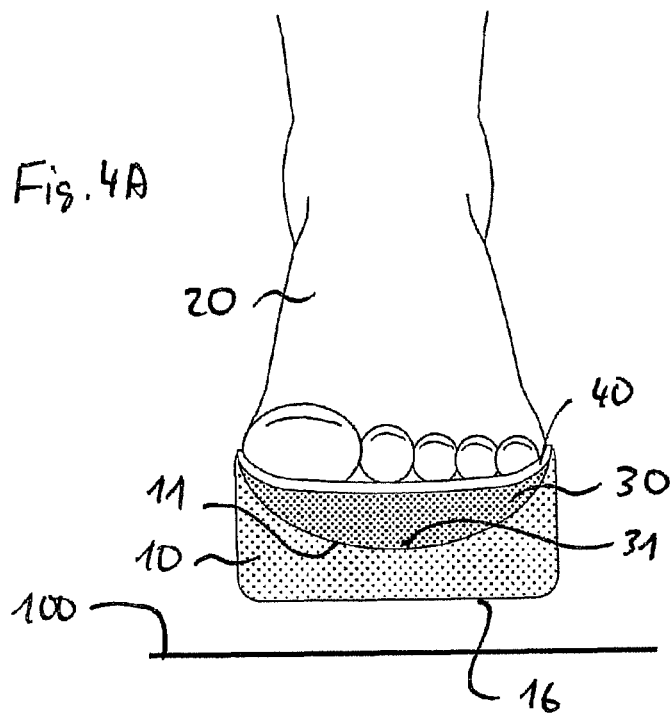
FIG. 4A shows a schematical front view of the main components of an embodiment of a shoe above ground.

FIG. 4A shows a schematical front view of the main components of an embodiment of a shoe above ground 100.

The outsole 10 is shown, having a flat lower surface 16 in cross-section in the fore area of the shoe. However, a person skilled in the art will structure the sole 10 according to the specific needs and application of the shoe. The foot 20 is engaging the extra insole 40, connected with insole 30, and thus connecting the sole 10 via embossment 31 and recess 11. Of course the embossment shown can also include parts of embossment 33. The shoe is shown above ground 100.

Figure 4B:
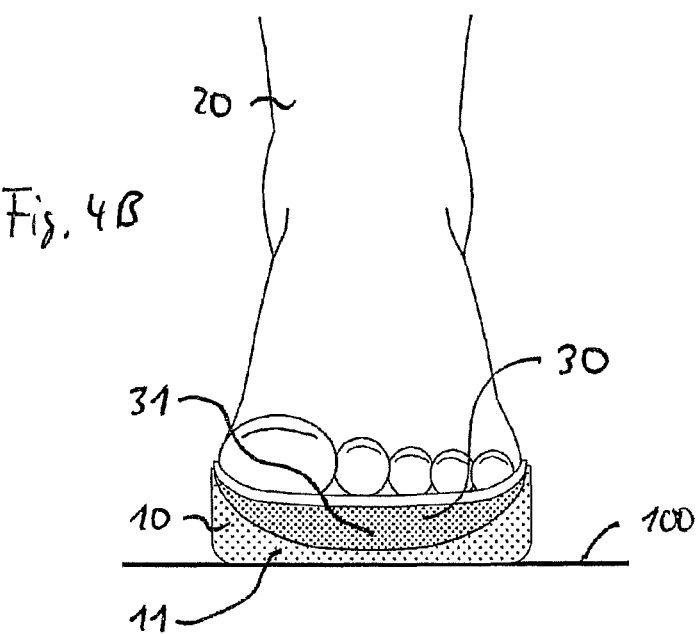
FIG. 4B shows the view of FIG. 4A of the shoe on the ground when the weight of the user compresses the soles.

FIG. 4B now shows the view of FIG. 4A of the shoe on the ground 100 when the weight of the user compresses the soles 10 and 30. The amount of compression derives from the weight of the user and the chosen materials. The material of the insole 30 is harder and less flexible than the material of the outsole 10. Outsole 10 can be a foam-like material which is compressed like a sponge when the weight of the user is applied to the soles. Preferably the insole 30 is made of a hard material as cork or polyurethane as a low density rigid foam. It is clear from FIGS. 4A and 4B that the more rigid sole 30 with its embossment 31 is far less compressed than the sole 10 around recess 11. This allows for an effective damping.

In other words, the spring function of the compressible outsole 10, provided by choice and thickness of the material, is preferably chosen so that the compressed position of the FIG. 4B is reached when the person wearing the shoe applies e.g., 25 kg on the portion 31 or 32. Of course it is also possible to make different shoes with different weight requirements wherein e.g., ⅓ of the weight of the person intended to wear the shoe has to be applied to said portion 31 or 32.

The entire weight should only be applied when the leg of the person wearing the shoe is already in an angled position for protecting said knee through muscles.

This effect can be enhanced if the entire sole is flexible in the sense that the effect of the compression is increasing gradually during each contact of the sole of the shoe with the ground until said maximal compression.

Figure 5A:
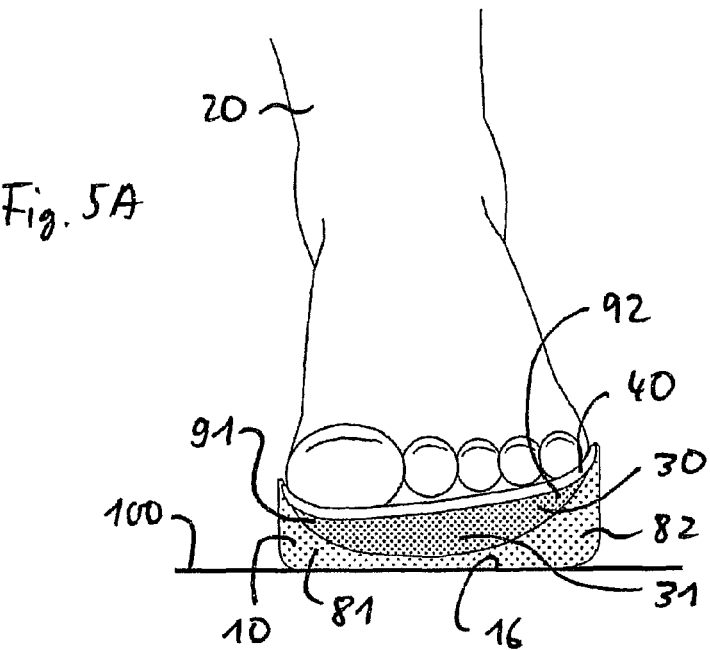
FIG. 5A shows a first pivoted position of the foot and the embodiment according in FIG. 4A/B.

FIG. 5A shows a pivotal action of the foot 20 on the ground 100 to the left hand side of the drawing sheet, wherein the embossment 31 is pivoted to the right hand side. In other words, the user is putting more weight in the region of the big toe, thus pivoting his foot on the embossment 31 which lowers the portion 91 of the insole 30 whereas the portion on the opposite side of the foot, i.e., portion 92, has more distance to ground 100. This is possible without the sole 10 leaving ground, since the portion 82 of the sole 10 is simply less compressed as is the portion 81. This is possible through the rounded convex form of the embossment 31 and, since the shoe soles are provided as a single piece, by the complementary form of the embossment 31 in view of the recess 11 in outsole 10.

Figure 5B:
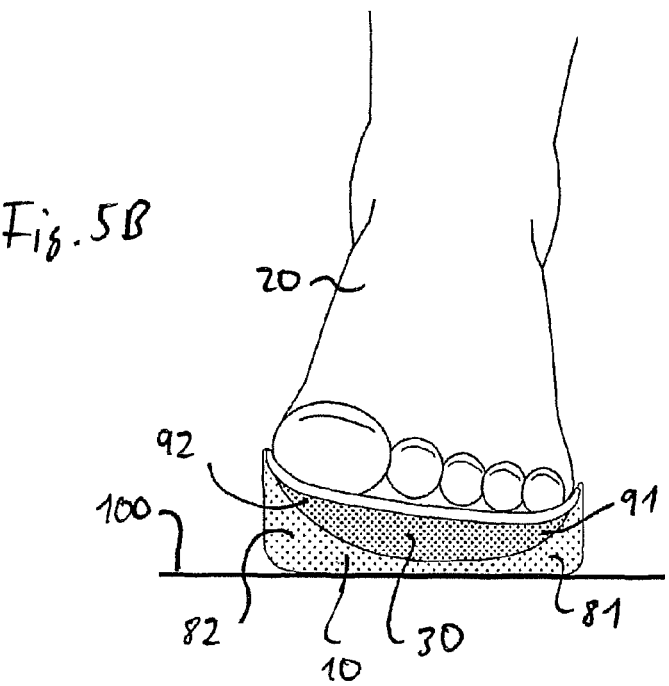
FIG. 5B shows a second pivoted position of the foot and the embodiment according to FIG. 4A/B.

FIG. 5B shows the opposite pivotal action of the foot, wherein the material of the embossment 31 is pivoted on the left hand side of the drawing, thus providing the less compressed foam sole 10 on the left hand side of the drawing.

Figure 6A:
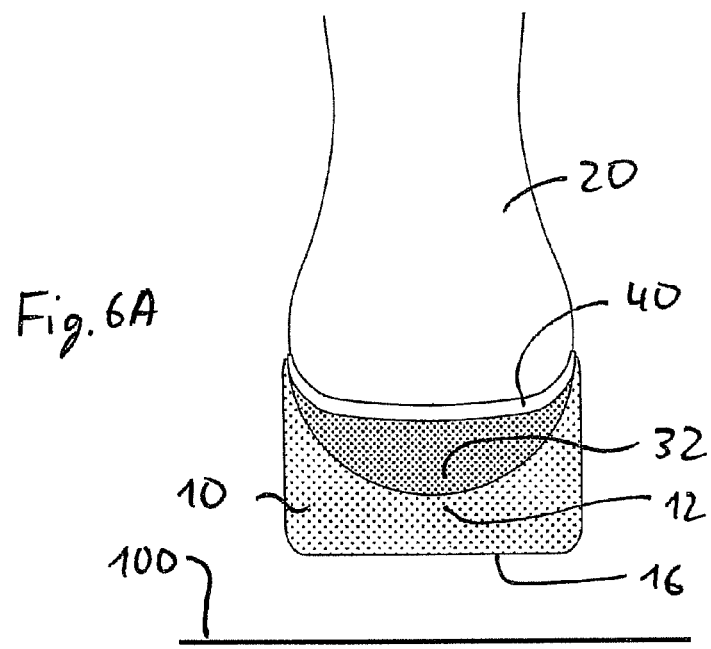
FIG. 6A shows a back view of the embodiment of FIG. 4A above ground.

FIG. 6A shows a back view of the sole portion of the shoe according to FIG. 4A, wherein it is clearly visible that the heel embossment 32 is in its cross section far thicker than in the front portion of the shoe, shown in FIG. 4A. The embossment 32 has a quasi-spherical form with the centre of the curvature being virtually provided in the heel around the centre of the calcaneus.

Figure 6B:
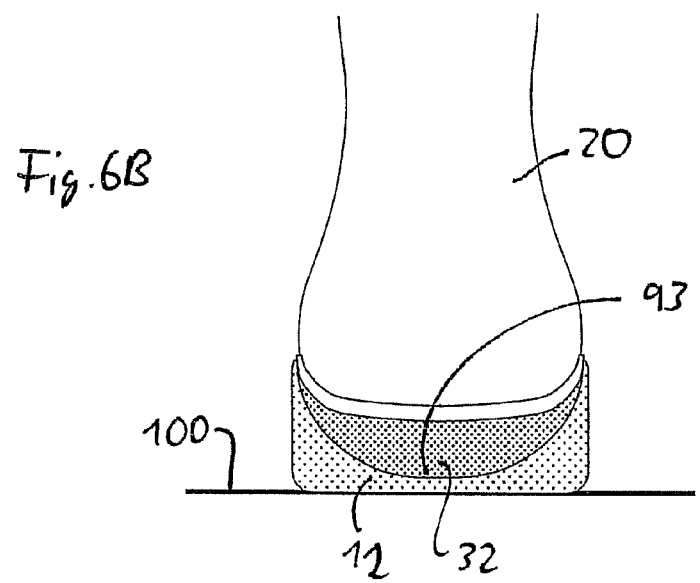
FIG. 6B shows the view of FIG. 6A of the shoe on the ground when the weight of the user compresses the soles.

FIG. 6B now shows the view of FIG. 6A of the shoe on the ground 100 when the weight of the user compresses the soles 10 and 30. The amount of compression derives from the weight of the user and the chosen harder material of the insole 30 and the more flexible material of the outsole 10. It is clear from FIGS. 6A and 6B that the more rigid sole 30 with its embossment 32 is far less compressed than the sole 10 around recess 12. This allows for an effective damping when the shoe is put on ground 100 and, preferably, stabilizes the position of the foot 20 through the middle portion 93 of the embossment 32 which can have a lower curvature through either slight compression of the embossment 32 or a deviation from the mentioned spherical curvature in cross section.

Figure 7A:
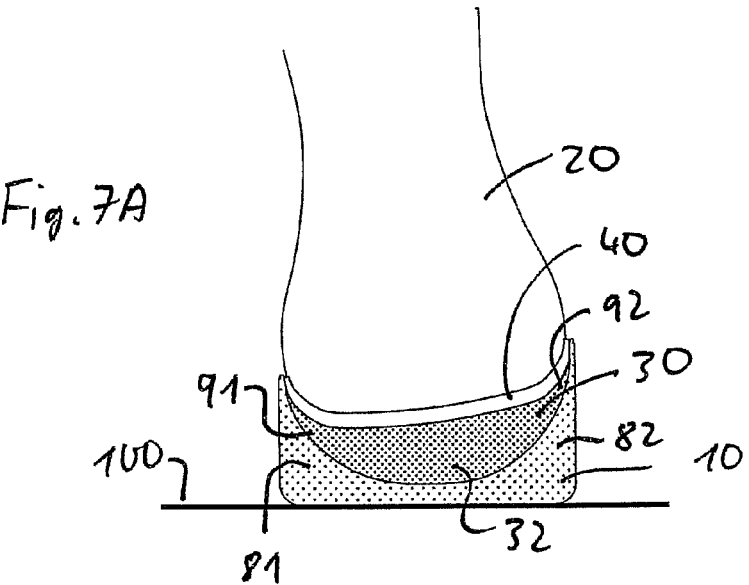
FIG. 7A shows a first pivoted position of the foot and the embodiment according to FIG. 6A/B.

FIG. 7A shows a pivotal action of the foot 20 on the ground 100 to the left hand side of the drawing sheet, wherein the embossment 32 is pivoted to the right hand side. In other words, the user is putting more weight to the left, thus pivoting his foot 20 on the embossment 32 which lowers the portion 91 of the insole 30 whereas the portion on the opposite side of the foot, i.e., portion 92, has slight more distance to ground 100. This is possible without the sole 10 leaving ground, since the portion 82 of the sole 10 is simply less compressed as is the portion 81. This is possible through the rounded convex form of the embossment 32 and, since the shoe soles are provided as a single piece, by the complementary form of the embossment 32 in view of the recess 12 in outsole 10 and the flexible compression of outsole 10 which also encloses the inclusion of shearing forces, i.e., forces oriented in a transverse direction.

Figure 7B:
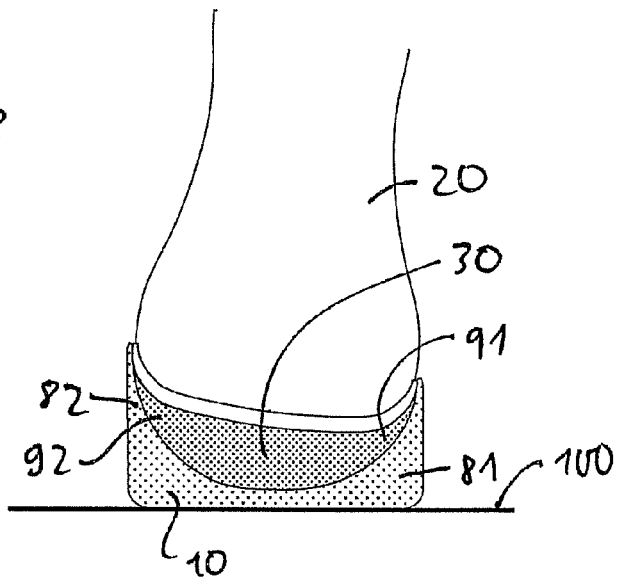
FIG. 7B shows a second pivoted position of the foot and the embodiment according to FIG. 6A/B

FIG. 7B shows the opposite pivotal action of the foot, wherein the material of the embossment 32 is pivoted on the left hand side of the drawing, thus providing the less compressed foam sole 10 on the left hand side of the drawing.

Figure 7C:
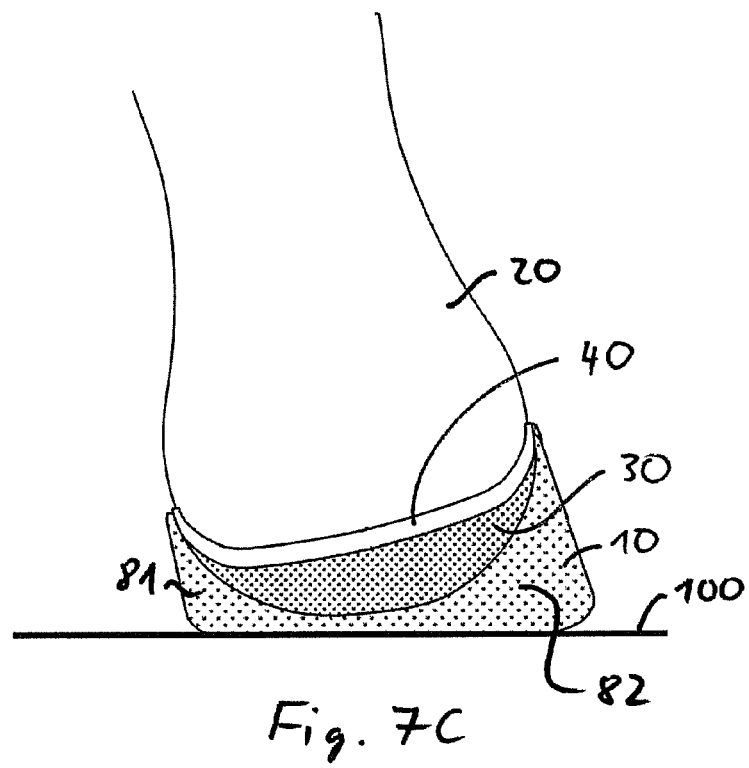
FIG. 7C shows a pivoted position of the foot similar to FIG. 7A.
Figure 7D:
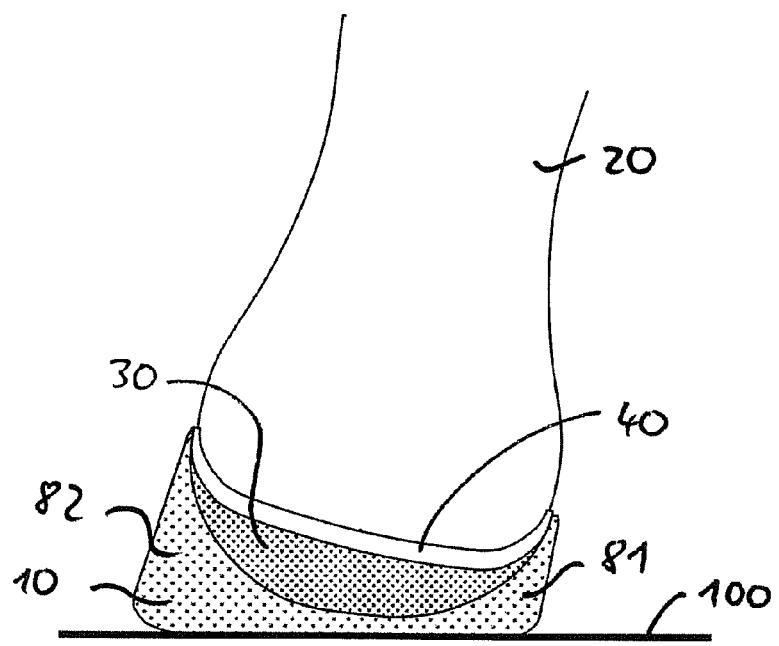
FIG. 7D shows a pivoted position of the foot similar to FIG. 7B.

FIGS. 7C and 7D show pivotal positions similar to FIGS. 7A and 7B wherein the compression of the more resilient and more elastic sole 10 is more pronounced then in FIGS. 7A and 7B. The less resilient sole 30 is also compressed in comparison to the representation of the soles in FIG. 6A before positioned on the ground 100. The portion 82 of the sole 10 is clearly less compressed as is the portion 81 on the other transversal side of the foot 20.

Figure 8:
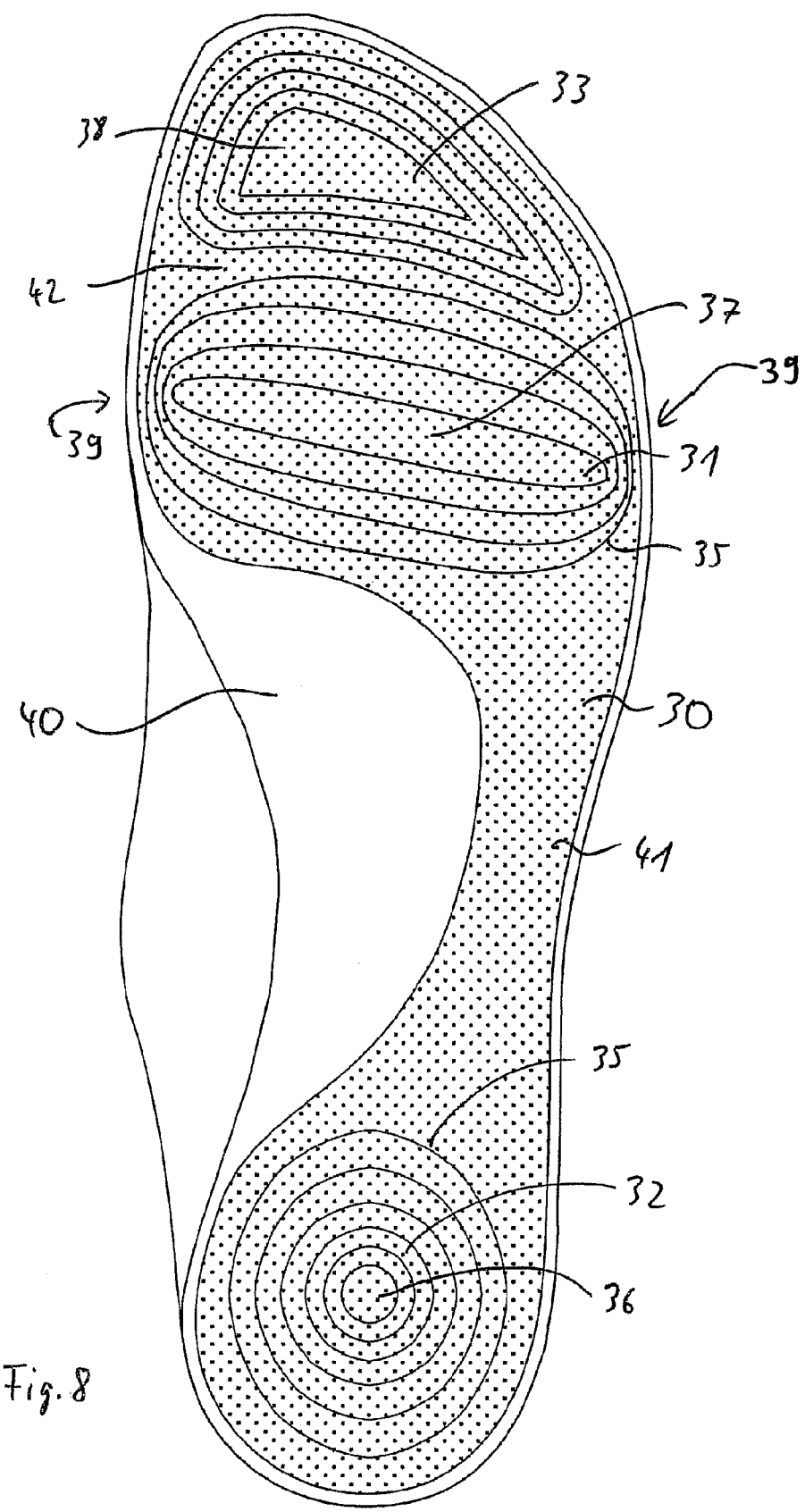
FIG. 8 shows a view from below on the insole of the shoe, according to FIG. 1.

FIG. 8 shows a view from below of the insole 30, wherein an additional extra insole 40 is provided. The embossment area 31 is connected with the embossment area 32 through a thin transitional area 41, taking into consideration the form of the transverse arch of a foot of a user of the shoe. The two embossments 31 and 32 are positioned at the end points of the so-called longitudinal arch of a foot of a user of the shoe. The heel embossment 32 is a blunt conical or essentially spherical embossment, which is shown in FIG. 8 through contour lines or level curves 35. The central area can be different to a spherical dome 36, to allow more stability of the contact area of the embossment 32 within the recess 12. The recess 12 is complementary to the embossment 32, which is self-evident when the soles 10 and 30 are made in one piece. The central area can be a spherical dome 36 and comprise a slight less rigid material inclusion to allow the formation of the flattened central area 93 as mentioned above upon application of the weight of a person.

In the embodiment shown in FIG. 8, the front embossment 31, on which (on the upper surface 43 of the insole 40) the ball of the foot is positioned, has the form of a longitudinal ridge 37, as shown with the contour lines 35. The third embossment 33 has a triangular form 38, wherein the transitional area 42 is not pronounced.

In other embodiments, the ridge 37 can be less pronounced in the transverse direction, so that the different contour lines 35 on the two lateral sides 39 of the foot are spaced from each other, which allows an easier transverse pivot action. However, since the main weight of a person is supported in the heel embossment section 32, the possibility of a pivoting and turning motion around the embossment section 36 is sufficient to obtain the desired effect.

The insole 30 can be produced in cork or latex or a soft solid elastomer, which can also be provided on a polyurethane basis. Additionally polyurethane cushions can be provided. Sole 10 is a flexible foam, e.g., a polyurethane low density flexible foam.

The insole 40 is preferably a leather sole, and can also be made from latex. The embossments can be made of caoutchouc, natural rubber or polyurethane, to act as cushion pads.

Figure 9:
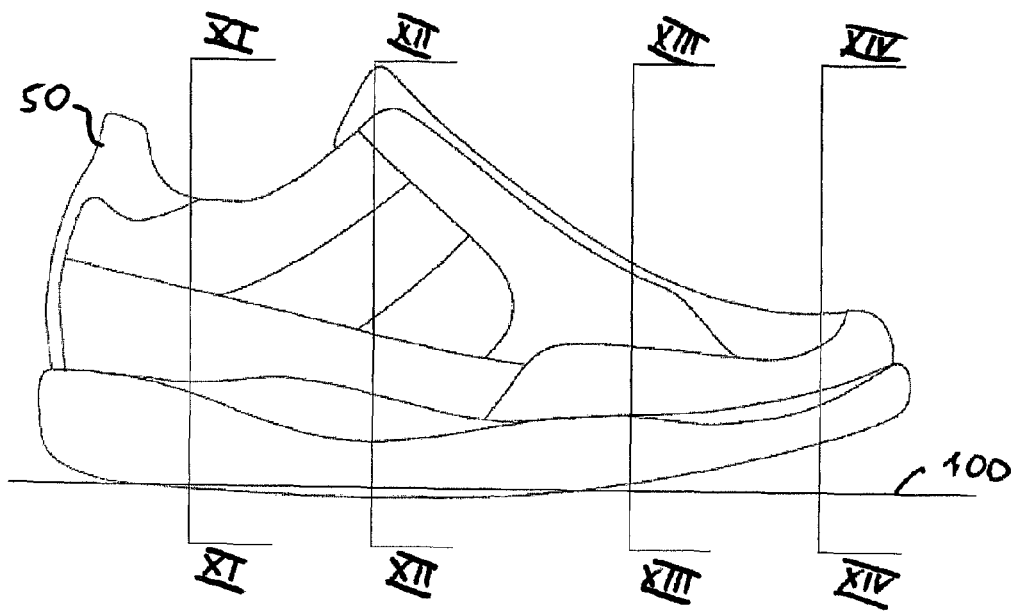
FIG. 9 shows a schematical side view of the main components of a shoe according to the invention, including an upper of the shoe, with four lines for views in cross-section.
Figure 10:
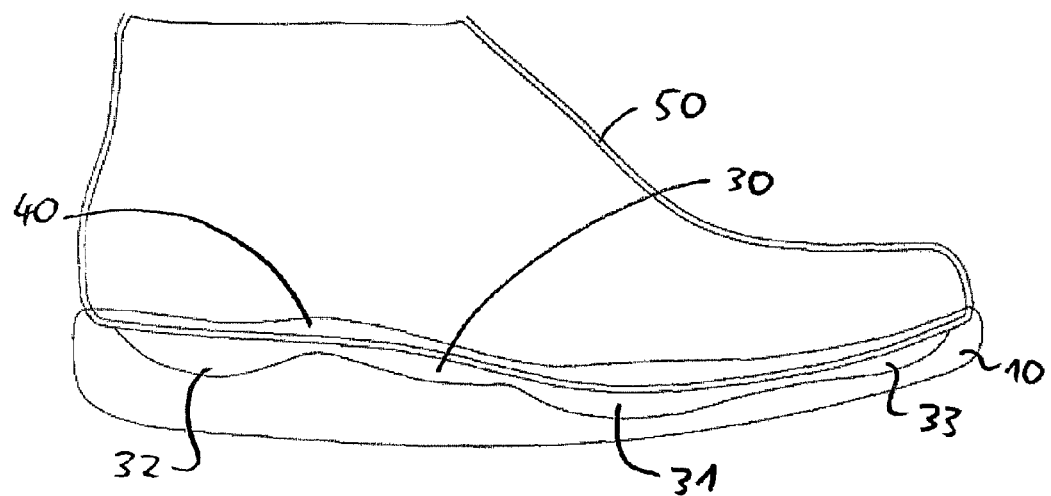
FIG. 10 shows a schematical view in cross-section of the shoe according to FIG. 9.
Figures 11, 12:
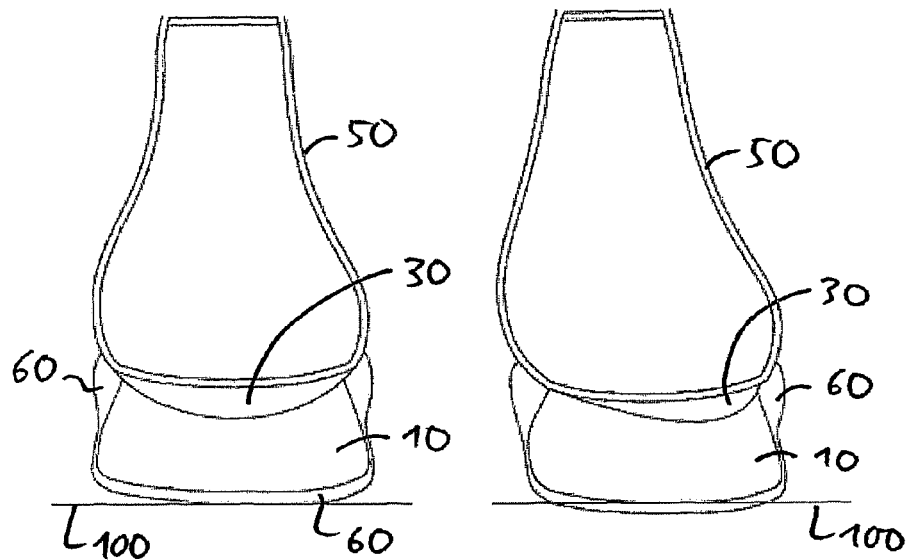
FIG. 11 shows a schematical view in cross-section according to line XI-XI of FIG. 9.
FIG. 12 shows a schematical view in cross-section according to line XII-XII of FIG. 9.

FIG. 9 shows a schematical side view of the main components of a shoe according to the invention, including an upper 50 of the shoe. Four lines XI-XI, XII-XII, XIII-XIII and XIV-XIV indicate cross-sections shown in views in FIGS. 11 to 14. FIG. 10 shows a further cross-section in longitudinal direction of the shoe. The shoe is positioned on the ground, wherein this is shown through horizontal line 100, showing an intended deformation of the middle portion of the soles.

Figures 13, 14:
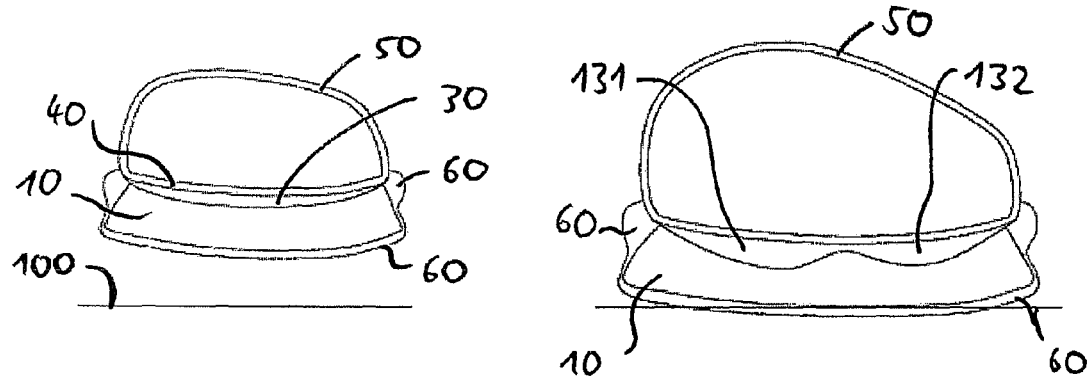
FIG. 13 shows a schematical view in cross-section according to line XIII-XIII of FIG. 9.
FIG. 14 shows a schematical view in cross-section according to line XIV-XIV of FIG. 9.

FIG. 10 shows three embossment zones 31, 32, and 33 as explained in connection with an embodiment according FIG. 8. From FIG. 13 showing a cross-section through the ball area, it can be seen that the embossment 31 from FIG. 8 is separated, in this embodiment, in two embossments 31 and 32. Every embossment 31 and 32 is a rounded cone or sphere and the corresponding recesses in the less rigid sole 10 are rounded inverse cones or spheres.

In all FIGS. 11 to 14 it can be seen that the entire resilient outsole 10 is encompassed by a protective outer sole 60. The outer sole 60 is a thin sole with a uniform thickness in the zone facing the ground 100 and on the lower portion of the sides. However, the outer sole 60 is preferably thicker in the transition zone towards the upper 50, at which said outer sole is attached. It is furthermore noted that the outer sole 60 is equally attached, preferably glued as well to the outsole 10. In fact the outsole 10 becomes a midsole through application of outer sole 60.

Figure 15:
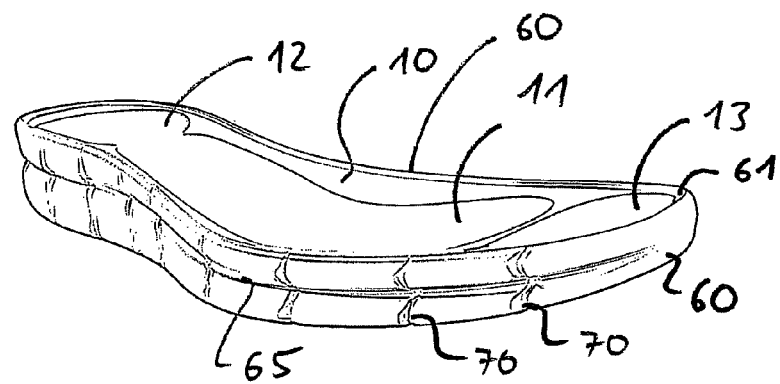
FIG. 15 shows a schematical perspective view of several sole components of a shoe according to a further embodiment of the invention, without showing an upper of the shoe.

FIG. 15 shows an schematical perspective view of several sole components of a shoe according to a further embodiment of the invention, without showing an upper 50 of the shoe. The representation shows the softer outsole 10 being surrounded by the outer sole 60. The outer sole 60 forms a ridge 61 being higher than the upper surface of the outsole 10. This enables direct attachment of the outer sole to an upper and/or the insole 30.

It can be seen from FIG. 15 that the outsole 10 provides three depressions 11, 12 and 13. The heel depression 11 is connected with a transition zone ending in the ball depression 12. The toe depression 13 is a separated depression.

The outer sole comprises a horizontal ridge 65 which runs around the entire shoe. It is preferred that said horizontal ridge 65 is at least present in the heel section as well as in the transition zone and may end in the ball section/toe section. The horizontal ridge 65 which is within the outer sole 60 and which can also be provided in the material of the outsole 10 allows an easier compression of the outsole 10/outer sole 60, when the foot of a user compresses the sole complex, since it provides a folding line.

Furthermore, it is optional to provide a plurality of vertical grooves 70 around the circumference of the sole 60, wherein it is preferred to have these vertical grooves 70 in the area of the transition zone and heel zone, since the vertical grooves 70 help for an additional folding of the shoe in longitudinal direction. Preferably, the vertical grooves 70 are as deep as are the horizontal groove 65.

Figure 16:
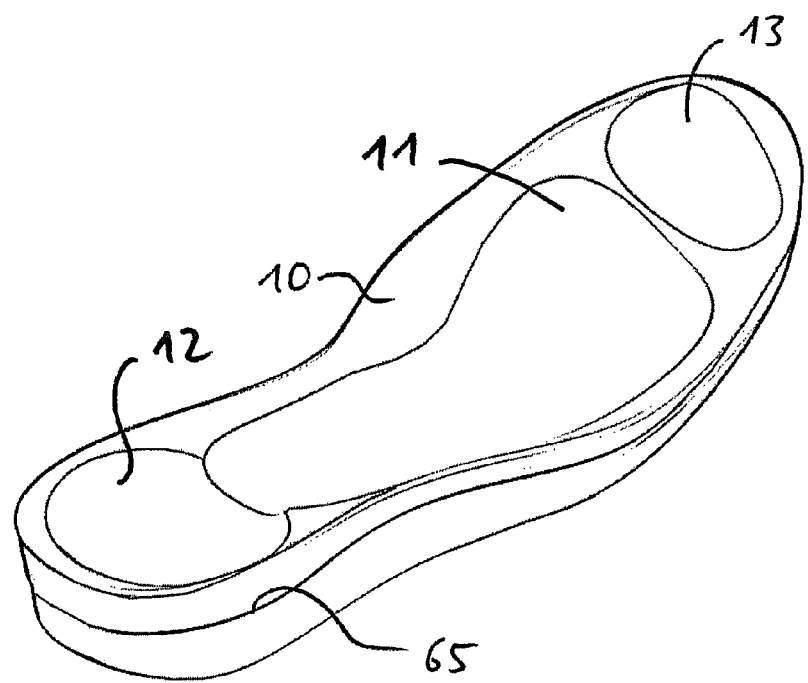
FIG. 16 shows a different perspective view of another further embodiment, similar to the embodiment of FIG. 15.

FIG. 16 shows a different perspective view of another further embodiment, similar to the embodiment of FIG. 15, wherein there is no outer sole 60 and wherein the outsole 10 is in fact the sole touching the ground 100. Therefore the horizontal groove 65 is directly provided in the outsole 10. The function is identical to the horizontal groove 65 of the embodiment of FIG. 15.

Figure 17:
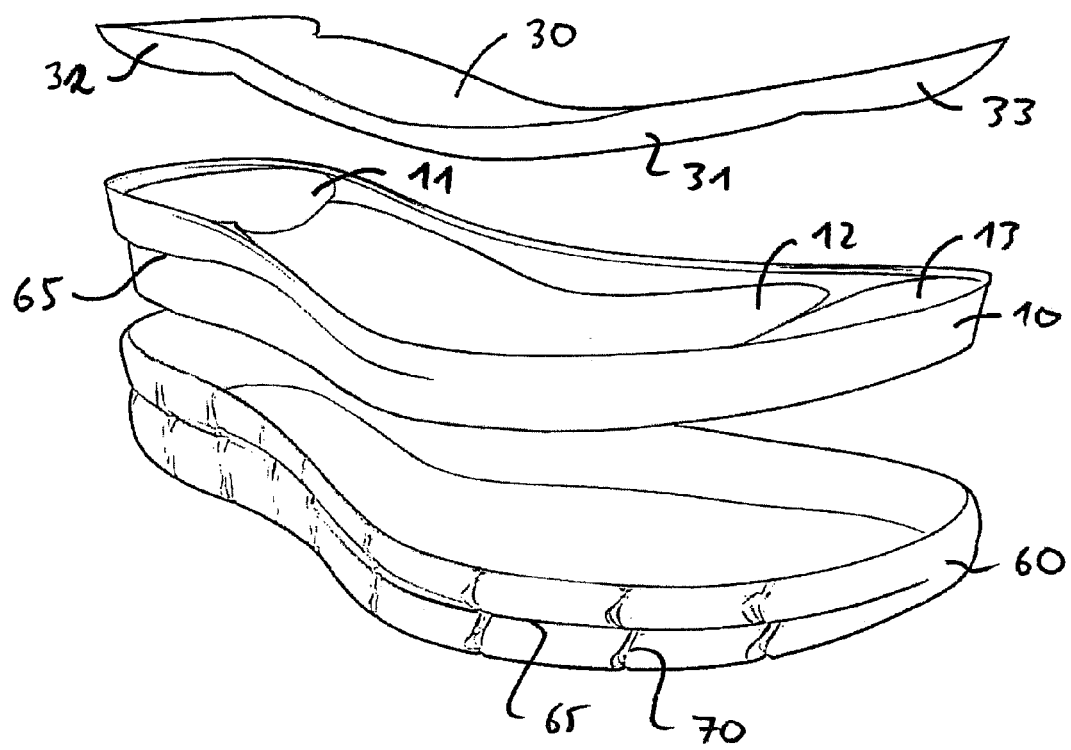
FIG. 17 shows an exploded schematical side view of the main components of the soles according to the embodiment of FIG. 15.

FIG. 17 shows an exploded schematical side view of the main components of the soles according to the embodiment of FIG. 15. It can be seen that horizontal groove 65 extends in the outsole 10, being encompassed by outer sole 60. Of course, it is intended to co-produce a synthetic sole comprising soles 60 and 10 so that the adhere directly one to another. The same is true for the rigid insole 30, which can comprise one (31+32+33) or two (31+32 and 33) parts.

The outer sole 60 provides a shell for the outsole 10 improving the stability of the entire sole, especially through the possible connection of the outer sole 60 with the other sole components 10 and 30 as well as with the upper 50.

The outer sole 60 is less resilient that the outsole 10 and provides a harder shell for the soft outsole 60 enhancing the stability of the entire sole as such, which is more difficult to achieve using very resilient outsole 10 material having a very low Shore value. Of course, the harder outer sole 60 also improves the lifetime of the shoe sole as such, since it is the only element in contact with the ground 100.

Between the heel ball or sphere or cone 32 and the ball cone 31 is provided a thick soft outsole 10 zone being thicker than the other outsole parts to avoid any controlling element between heel and ball which could hinder the 3D movement of the foot in transversal as well as longitudinal movement. In other words the entire sole complex can be twisted like a spiral.

The upper 50 is connected with the hard intermediate insole 30 providing stability for the foot itself. On said hard intermediate insole 30 can be provided a softer inner sole being in direct contact with the foot which softer inner sole provides for an enjoyable force transmission between the foot 20 and the hard insole 30.

It is also possible to structure the insole 10 not only in the thickness, i.e., higher heel portion, thick transition zone to a more shallow ball zone, but also in the choice of materials, wherein the heel portion and transition zone is more resilient than the ball zone and toe zone which are also less thick.

The toe embossment 33 is preferably separated or only connected by a film hinge with the ball embossment to allow for a natural movement of ball and toes of a foot in the shoe. The separation allows practicing the toes as such.

The ball embossment can be provided less rounded than the heel embossment (semi-spherical) or the toe embossments, since the pitch of the last provides a V-shape allowing for a rolling motion of the foot.

The invention relates to a shoe with a sole 10 and an insole 30, wherein the sole 10 comprises an upper surface 14 being in contact with the lower surface 34 of the insole 30. The insole 30 comprises at least two embossments 31, 32, 33 being in contact with the upper surface 14 of the sole 10 which is therefore configured as comprising complementary depressions 11, 12 and 13, respectively. The insole 30 is more rigid than the outsole 10 and is attached to the outsole 10, allowing a pivoting movement of the front and/or back portion of the harder intermediate insole 30 against the lower outsole surface 16 of the shoe in, at least, an essentially transverse direction to the longitudinal axis of the shoe. The embossment 32 of the heel is preferably a rounded cone or sphere (portion). The embossment 31 of the ball is preferably a rounded cone or sphere (portion) or has a rounded prism like form. The optional embossment 33 of the toes is preferably a rounded cone or sphere (portion) or having a triangular form for all toes or single rounded portions for single or group of toes.

In the embodiments according to FIG. 1 or FIG. 9 it is possible that the more resilient and less rigid outsole 10 does not possess recesses as such but is, before mounting the different soles together a sole element of uniform thickness. Upon pressing the rigid insole 30 on and into the outsole-element 10, the recesses form, so that the final product possesses said recesses. In this context the attachment through gluing of insole 30 to outsole 10 is important in the lateral border regions, within which more initial stress is applied onto the outsole 10. It is favourable that this region is then covered by the protecting outer sole 60, which is additionally attached at the upper 50 and protects the connection area between upper 50, insole 30 and outsole 10. It is then also possible, that the insole 30 connects and is glued to the outer sole 60. The outer sole is preferably made from rubber and can be built as a rubber cup encompassing and containing the resilient outer sole material.

The less rigid or resilient outsole 10 can be made from a material from the group comprising: polyurethanes (PUR), ethylene vinyl acetate (EVA), natural rubber. It is also possible to use silicones or styrol isoprene copolymer.

The more rigid insole 30 can be made e.g., from wood or wood-plastic compounds.

It is also possible to use compact foams wherein the harder skin is used as insole 30 and the foam portion as outsole 10.

The insole 30 can also be called intermediate insole 30, since usually there is an additional layer against the foot of the user. The intermediate insole 30 has a great pitch of the last. There is an important difference between the height of the heel portion and the middle portion. It also provides a great pitch of the heel against the end of the shoe.

The great pitch of the last in connection with the semi-spherical portions 12 and 11 of the hard intermediate insole 30 provide the instability and the 3D movement of a foot being equipped with said shoe sole combination.

Figure 18:
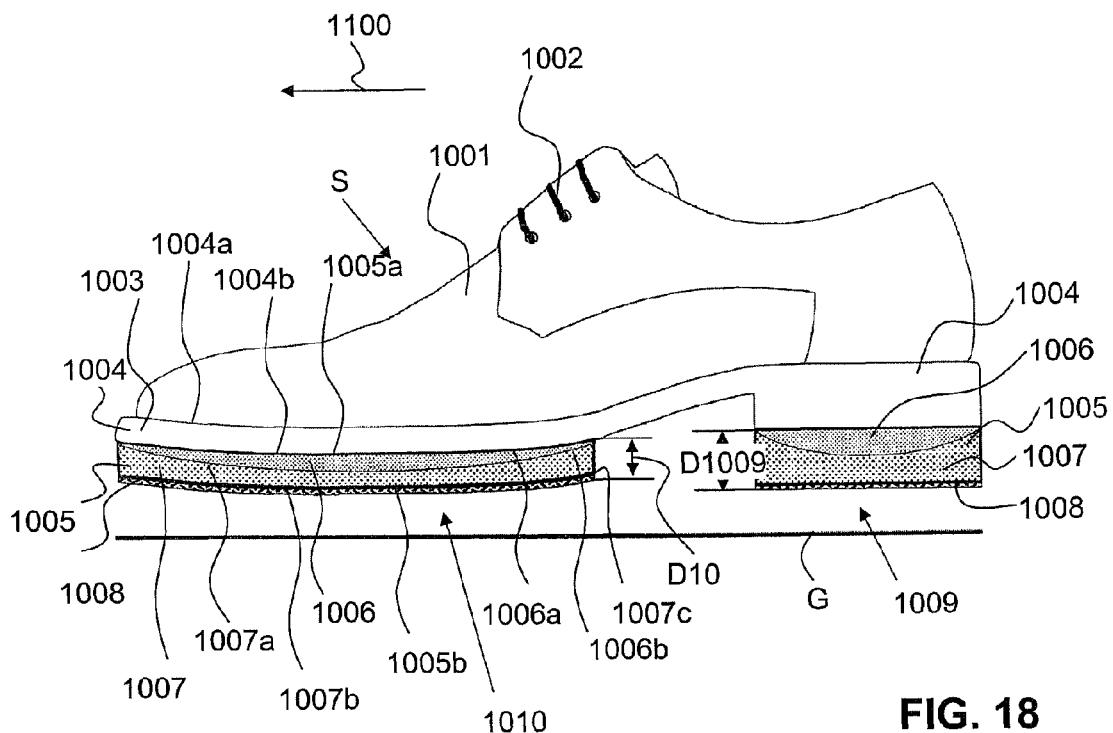
FIG. 18 shows a side view of an inventive shoe having a sole according to an embodiment of the present invention.

FIG. 18 shows a side view of a shoe having a sole according to an embodiment of the present invention. The shoe S comprises an upper material 1001 to which a sole 1003 is attached. Furthermore the shoe S here comprises laces 1002 in order to tighten the shoe to the foot of a wearer. The shoe S here is shown as low shoe, but the sole 1003 as described herein may be attached to any other type of footwear such as running shoes, hiking boots, loafers etc. The structure of the shoe sole is described herein.

Figure 23:
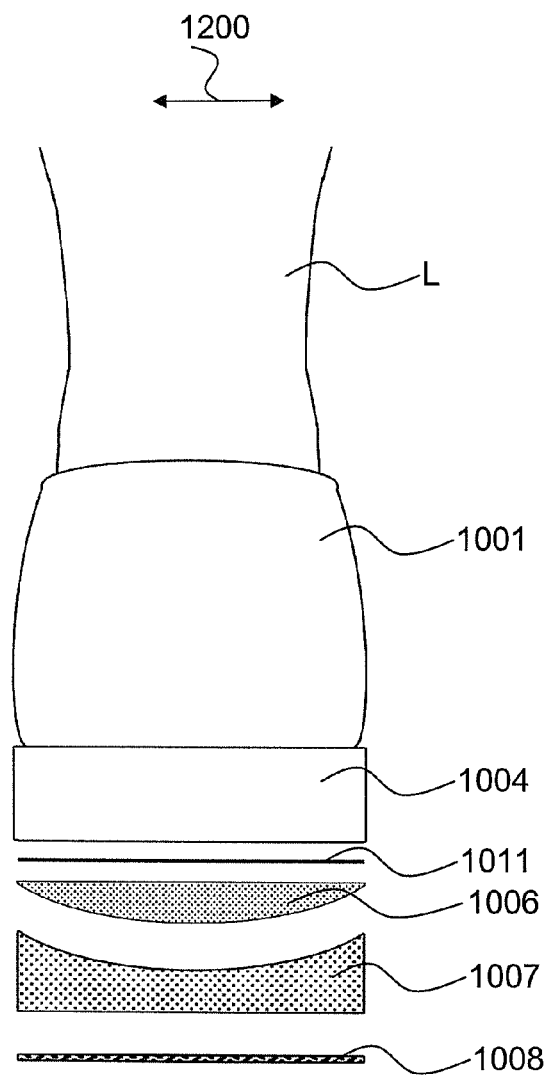
FIG. 23 shows a back view of FIG. 22.

FIG. 18 is also used to define two directions being used to define certain elements. A longitudinal axis 1100 or direction extends from the heel towards the toes or the tip of the shoe in horizontal direction (i.e., parallel to the ground G). A lateral axis 1200 or direction (as shown in FIG. 23) extends also in a horizontal direction, but orthogonal to the longitudinal axis.

Reference is now made to the front part or forefoot 1010 of the shoe S. The sole 1003 comprises here an insole 1004, a midsole element or midsole 1005 and an outer sole 1008. The insole 1004 is attached to the upper material 1001 with its upper surface 1004a. The lower surface 1004b faces the upper surface 1005a of the midsole element 1005 and is in connection with the same as outlined below. The lower surface 1005b is then followed by the outer sole 1008 which is in connection with the midsole 1005 via the surface 1005b. The outer sole 1008 faces the ground G, when the wearer of the shoe is walking.

With regard to the heel portion 1009, the same as previously described, applies. Therefore in that portion the insole 1004, the midsole element 1005 as well as the outer sole 1008 are arranged in the same manner as previously described with the front portion 1010.

It has to be noted here that the insole 1004 extends over the whole length of the shoe S or the upper 1001 itself.

The midsole element 1005 comprises a core 1006 and a resilient compression element 1007 which encompasses the core 1006.

The core 1006 comprises an upper surface 1006a and a lower surface 1006b. The upper surface 1006a faces towards the insole 1004 and is preferably in connection with the lower surface 1004b of the insole 1004. The lower surface 1006b faces towards the ground G and has a curved shape. Thereby the lower surface 1006b of the core 1006 is curved as viewed in longitudinal direction 1100 as well as in lateral direction 1200. The radius or the degree of the curve in these two directions may be equal such that a spherical surface is provided. In an alternative embodiment, the radius of the lower surface 1006a can be larger in a longitudinal direction than in a lateral direction or vice versa. The core 1006 is preferably made out of cork or polyurethane as a low density rigid foam. The core 1006 is harder than the compression element 1007. However, the term harder has to be understood in a sense that the core 1006 is preferably also compressible but not in a degree which is greater than the compression element 1007. In other words, the resilience of the compression element 1007 is larger or greater than the resilience of the core 1006. Preferably the resilience of the compression element 1007 is 1.5 to 3 times higher than the resilience of the core 1006.

The core 1006 is thereby fully covered by the compression element 1007. The compression element 1007 has an upper surface 1007a, a lower surface 1007b and a circumferential surface 1007c. The upper surface 1007a faces the lower surface 1006b of the core 1006. Thereby the upper surface 1007a extends preferably over the whole lower surface 1006b and has a shape corresponding to the lower surface 1006a of the core 1006. The lower surface 1007b of the compression element 1007 faces towards the ground G and is flat or planar. As the compression element 1007 encompasses the core 1006 completely, the core 1006 is not visible from the outside. Depending on the size of the core 1006, the upper surface 1007a of the compression element 1007 can also be in contact with the lower surface 1004b of the insole 1004. The lower surface 1007b of the compression element 1007 is covered by a conventional outer sole 1008, e.g., a rubber sole.

Referring back to FIG. 8, the heel portion or heel embossement 32 can be a blunt conical or essentially spherical embossment through contour lines or level curves 35. The front or forefoot embossment 31, on which (on the upper surface 43 of the insole 40) the ball of the foot is positioned, can have the form of a longitudinal or rounded ridge 37 as shown with the contour lines.

The compression element 1007 is made out of a softer material than the core 1006. Preferably the compression element 1007 is made out of a resilient plastic. The use of resilient plastic allows compression of the compression element when the wearer exerts a force onto a certain part (e.g., touches the ground with the heel) and expansion of the compression element as soon as the force wears off. In particular the use of a porous polyurethane has provided good results; as such a material allows fast compression/expansion due to the arrangement of the pores. In particular fast expanding pores are advantageous.

Generally the resilient structure of the compression element 1007 forces in particular the leg muscles to fine but constant activity in order to maintain balance and posture.

The compression element 1007 will be compressed as soon as force is exerted onto it. The degree of compression is adjustable by choosing a respective material and/or the size of the pores. During compression of the compression element, the core 1006 provides, at least to a certain degree, compensation or guidance of specific anatomical structures given by supination/pronation, as it is made out of a material which is not compressible.

Preferably the compression element 1007 is provided such that it will be compressed up to ⅔ of its original volume, when the user applies ⅓ of his body weight. The core 1006 will be compressed up to ⅓ of its original volume, when the user applies ⅔ of his weight. Other ratios are also possible. The value of ⅓ is to be understood to comprise a range between 25% to 40% and the value of ⅔ is to be understood to comprise a range between 60% to 75%. The ranges can be chosen in relation to the body weight of the person using the midsole.

Alternatively one can also say that the compression element 1007 will be compressed to a degree of 60% to 75% of its original volume and the core 1006 will be compressed to a degree of 25% to 40% of its original volume on a given load. A given load is to be understood as the body weight of the wearer.

The compression of the midsole element can be linear from the beginning to the end of the compression phase. Alternatively, the compression can be nonlinear from the beginning to the end of the compression phase.

The nonlinear compression can be similar to a $Y=1/X$-function, wherein Y being the degree of compression and X being the body weight such that the degree of compression is larger during the first compression phase and smaller during the second compression phase.

The core 1006 and the compression element 1007 plus the outer sole 1008 in the region of the heel 1009 have a thickness D1009 which is between 5 mm to 20 mm, preferably between 7 mm and 15 mm. In the front region 1010 of the shoe, the core 1006 and compression element 1007 have a thickness D10 in the region of 2 mm up to 7 mm, preferably up to 5 mm. The thickness can be related to the body weight of the user. Furthermore the size of the midsole element 1005 may be altered. This means that the shoe maker may be provided with a set of midsole elements 1005 for different shoes having different sizes.

Figure 19:
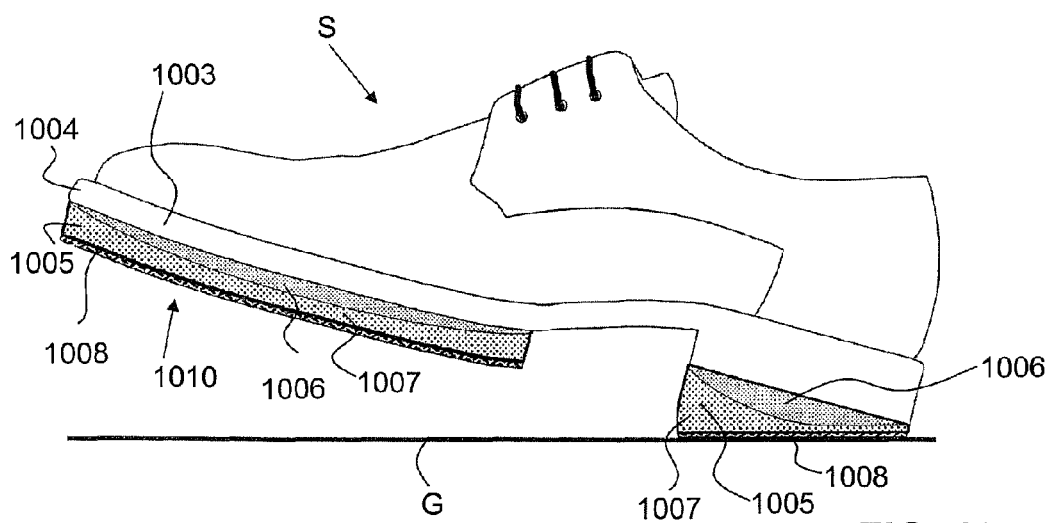
FIG. 19 shows the shoe of FIG. 19 at the moment when the wearer touches the ground with the heel.

Reference is now made to FIG. 19. In a first step when the wearer touches the ground G with the heel portion 1009, the compression element 1007 will be compressed. During the compression phase the wearer experiences a soft and absorbed touchdown. Towards the end of the compression phase the compression has reached a degree that the user realises the effect of the core 1006. Due to the shape of the core 1006 the shoe is in a static indefinite position which forces to user to correct said position constantly during the rolling phase. This is a major advantage as the wearer has to use his muscles as well as his coordinative abilities to correct the position constantly. Furthermore, any irregularities in the course of motion in the longitudinal direction will also be compensated during the compression phase of the compression element 1007. In other words, the compression element 1007 has a characteristic of a sponge.

In the case where the front region 1010, as well as the heel region 1009, are equipped with such a core 1006 and a compression element 1007, a rotational or pivoting movement around the longitudinal axis 1100 is permitted. A further pivoting movement is permitted around the lateral axis 1200 when the wearer of the shoe is walking especially in the phase from the touch down of the heel 1009 until the touch down of the front region 1010 and in the phase in which the shoe is rolling over the front region 1010 until it leaves the ground G. Thereby the wearer of the shoe has to compensate a rotational movement with his muscles.

With regard to the stiffness or hardness of the compression element 1007, the degree of the just described effect can be adjusted. It is therefore possible to provide a shoe having a stiffer compression element 1007 for daily use such as walking, running etc. For therapeutical use, for example after a surgery that influenced the anatomical structure of the wearer, it is possible to provide a compression element 1007 being softer in order to encourage the wearer of more compensation activity, having a positive therapeutical effect.

In an alternative embodiment it is also possible to provide the compression element 1007, that is arranged in the region of the heel 1009, with softer properties than the one that is arranged in the front region 1010 or vice versa. It is also possible that both compression elements 1007 in the heel 1009 and front region 1010, can be designed to have the same properties. It is advantageous to provide the compression element 1007, being arranged in the region of the front region 1010, with softer properties that are $\frac{1}{3}$ to $\frac{2}{3}$ softer than the one of the compression element 1007 being arranged in the region of the heel 1009.

The core 1006 and the compression element 1007 are connected together for example by means of a glue. In an alternative embodiment, the core 1006 and the compression element 1007 can be made out of one single piece. Thereby a two-component injection molding method may be used to produce such a single piece.

Figure 20:
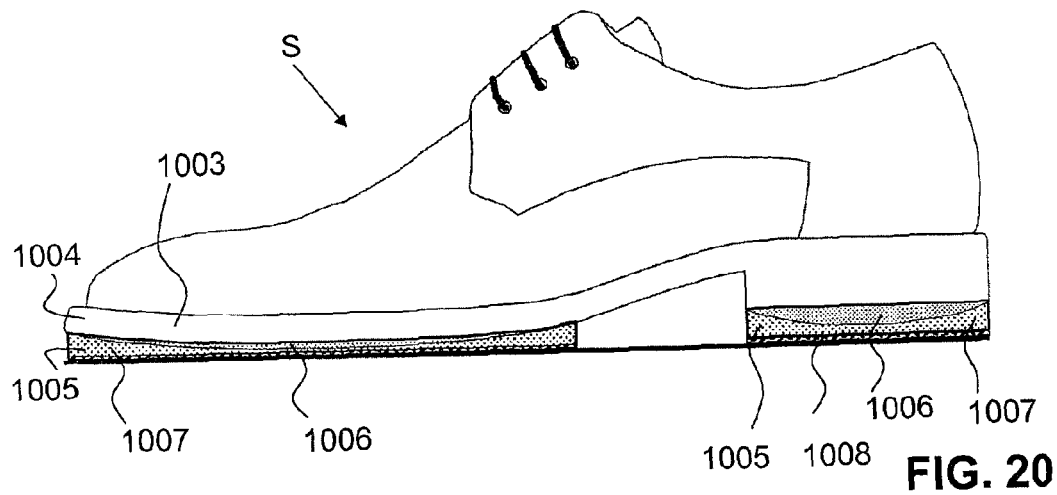
FIG. 20 shows the shoe of FIG. 19 at the moment when the wearer stands on the ground.
Figure 25:
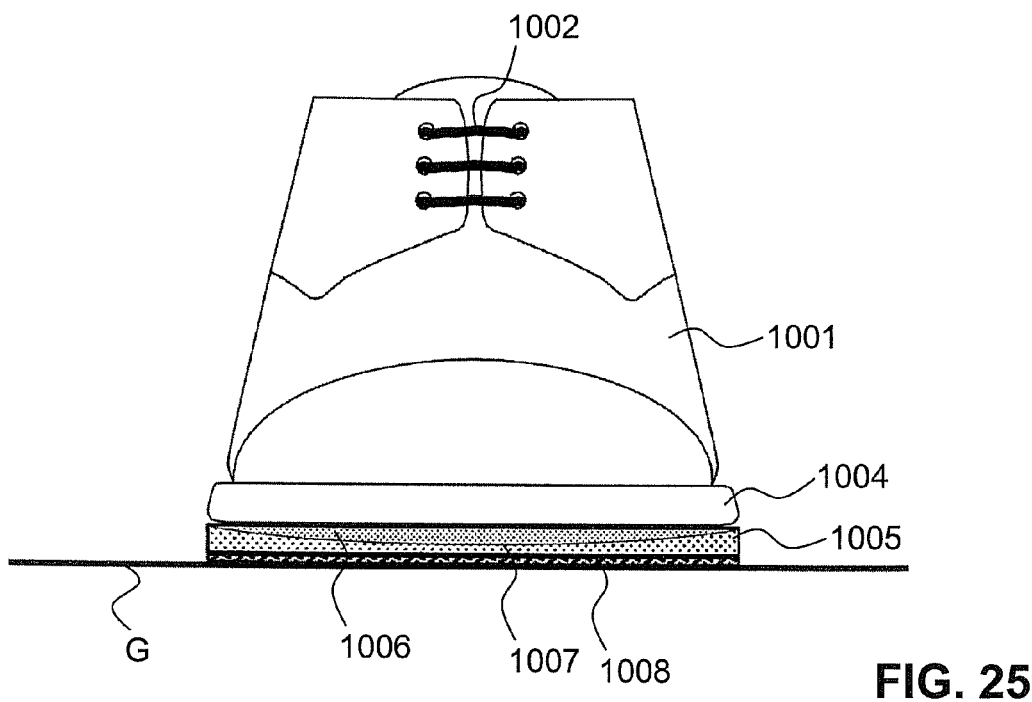
FIG. 25 shows a front view of FIG. 21.

FIGS. 20 and 25 show the position of the shoe when the user stands on the ground G. Thereby the compression element 1007 arranged in the region of the heel 1009 as well as the one arranged in the front region 1010 is compressed. If the user stands still, the sole provides statically instable conditions as the compression element 1007 acts resiliently and the shoe is supported on two points of the core 1006 only. The wearer will then continuously correct this statically instable position. Thereby the wearer has to activate his muscles constantly, even when he is not moving. This leads to a constant training effect and increases intramuscular coordination. Additionally the motor activity will be promoted.

Figure 21:
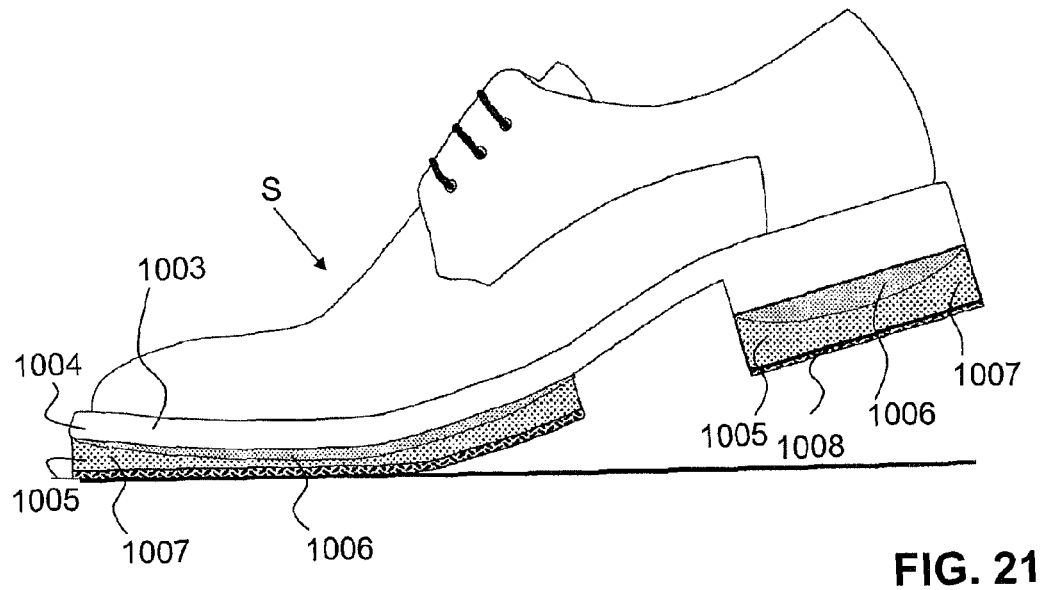
FIG. 21 shows the shoe of FIG. 19 during the rolling phase.

FIG. 21 shows the position during the rolling phase where the wearer rolls over the forefoot. Thereby the compression element 1007 is compressed in that part and the core 1006 provides guidance for the motion.

Figure 22:
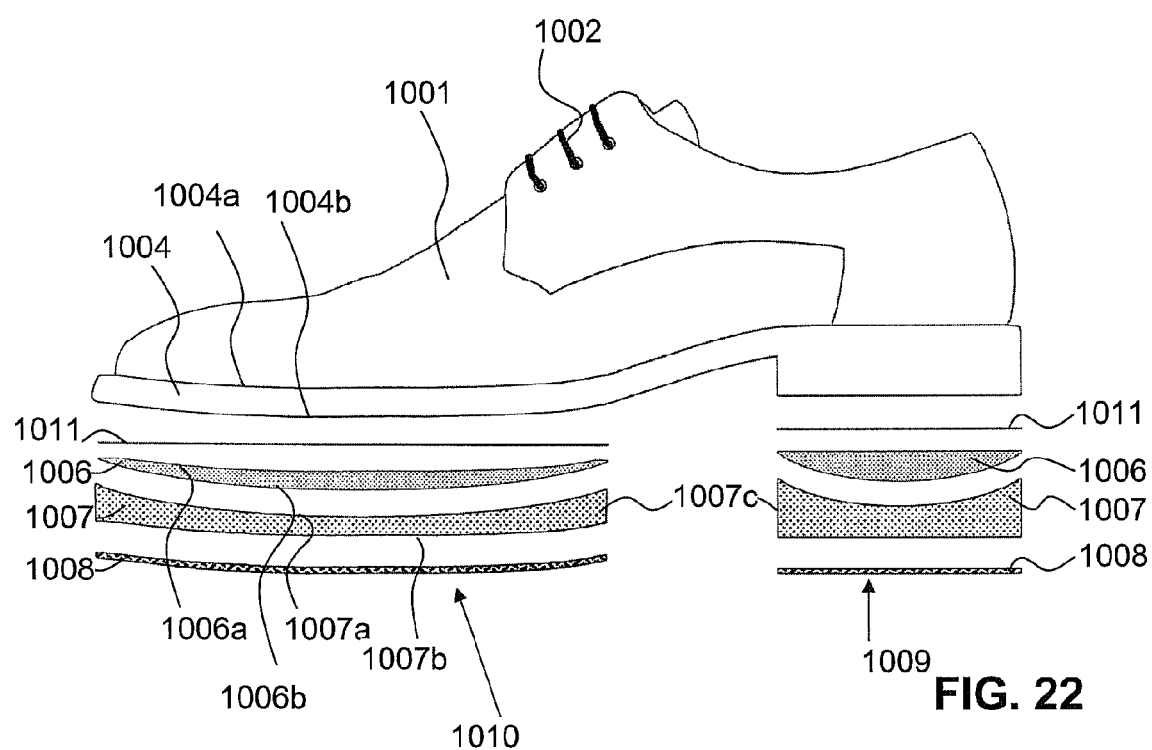
FIG. 22 shows an exploded view of the shoe according to FIG. 19.
Figure 24:
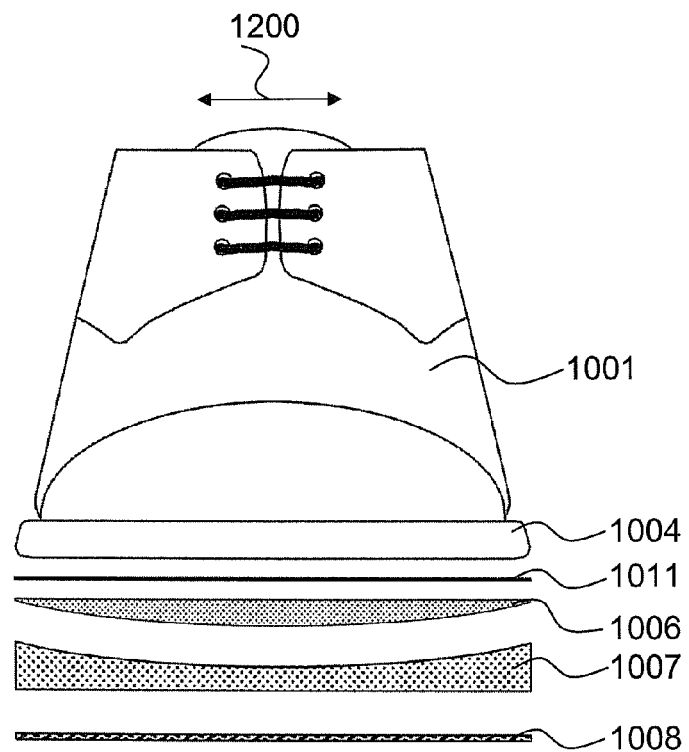
FIG. 24 shows a front view of FIG. 22.

FIGS. 22 to 24 show an exploded view illustrating the components. As mentioned above, the midsole element 1005 comprises a core 1006 and a compression element 1007. To prevent fast abrasion a outer sole 1008 may optionally be arranged. As it can be seen from FIG. 22 such a sole structure (i.e., core 1006 plus compression element 1007 and optionally outer sole 1008) may be glued with a layer of glue 1011 to an insole 1004. It is here noted that the sole structure (i.e., the midsole element 1005) may be glued to an existing shoe sole when the user would like to use the properties of said sole. This means that a shoemaker is provided with such a midsole element 1005 for the heel portion and for the front portion each of the midsole elements comprises a core 1006 and a compression element 1007 plus an optional outer sole 1008. The midsole element will then be glued to the insole 1004 of an existing shoe. In order to provide a midsole element such that fits to the heel portion 1009 or the front portion 1010, the shoe maker will cut the midsole element. Thereby the cutting surface provides the circumferential surface 1007c. Depending on the size of the core 1006 within the compression element 1007 and on the shoe itself, the core 1006 extends such that it provides also some parts of the circumferential surface 1007c as the core 1006 has also been cut. If a smaller core 1006 is being chosen, the circumferential surface 1007c is provided by means of the compression element 1007 only.

In another embodiment the midsole element 1005 can also be attached to the shoe by means of nails or bolts, both of which extend from the core 1006 over the upper surface 1006a of the core 1006. If nails will be used, the shoe maker simply hammers the midsole element 1005 until the nails extend into the respective portion of the shoe. When using bolts, the shoe maker has to provide the respective shoe portion with openings first, in which the bolts upon being attached, extend.

From FIG. 22 one can also see that the upper surface 1006a of the core 1006 has a shape in order to conform to the corresponding shape of the lower surface 1004b of the insole 1004.

FIG. 23 shows further more an arrow indicating the lateral direction 1200 as well as the leg L of the user.

Figure 26:
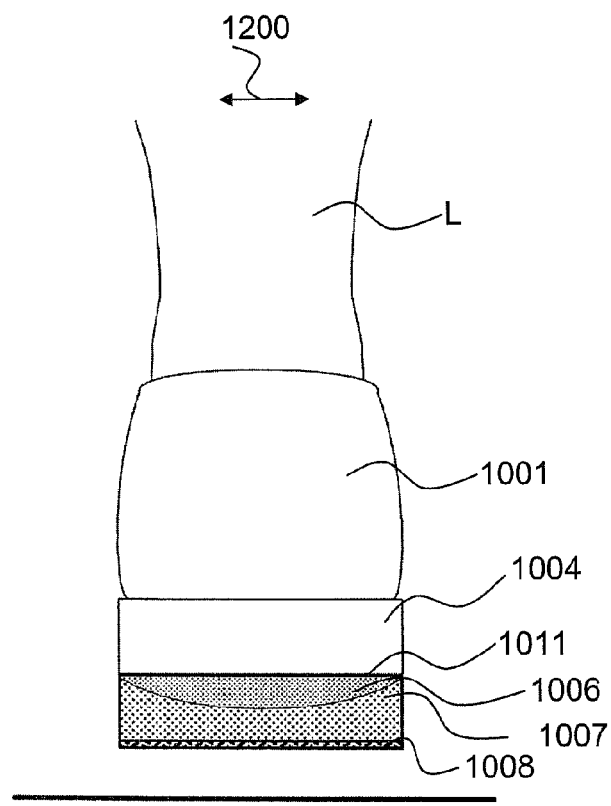
FIG. 26 shows a back view of FIG. 18.
Figure 27:
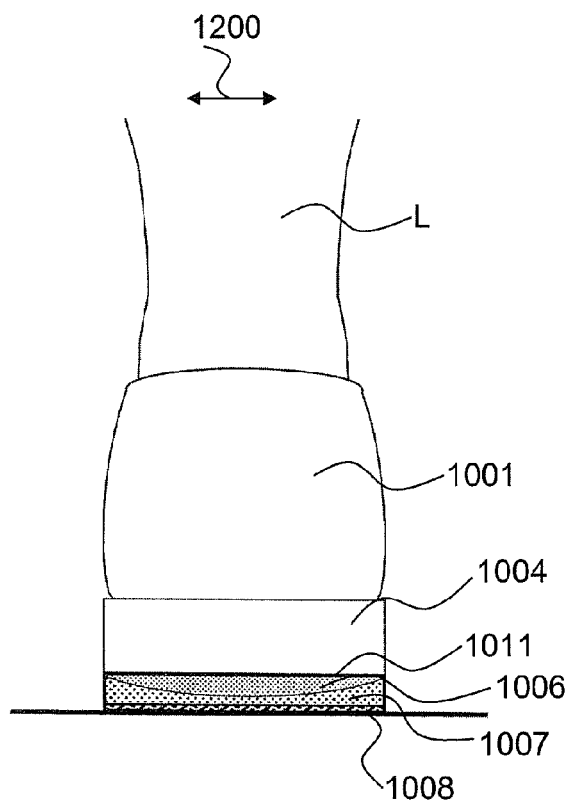
FIG. 27 shows a back view of FIG. 4.

FIGS. 26 and 27 show the shoe from behind in two different stages, namely when the heel 1009 is not in contact with the ground G (FIG. 26) and when the heel 1009 is in contact with the ground G (FIG. 27). Thereby the compression/expansion of the compression element 1007 is clearly recognisable.

Figure 28:
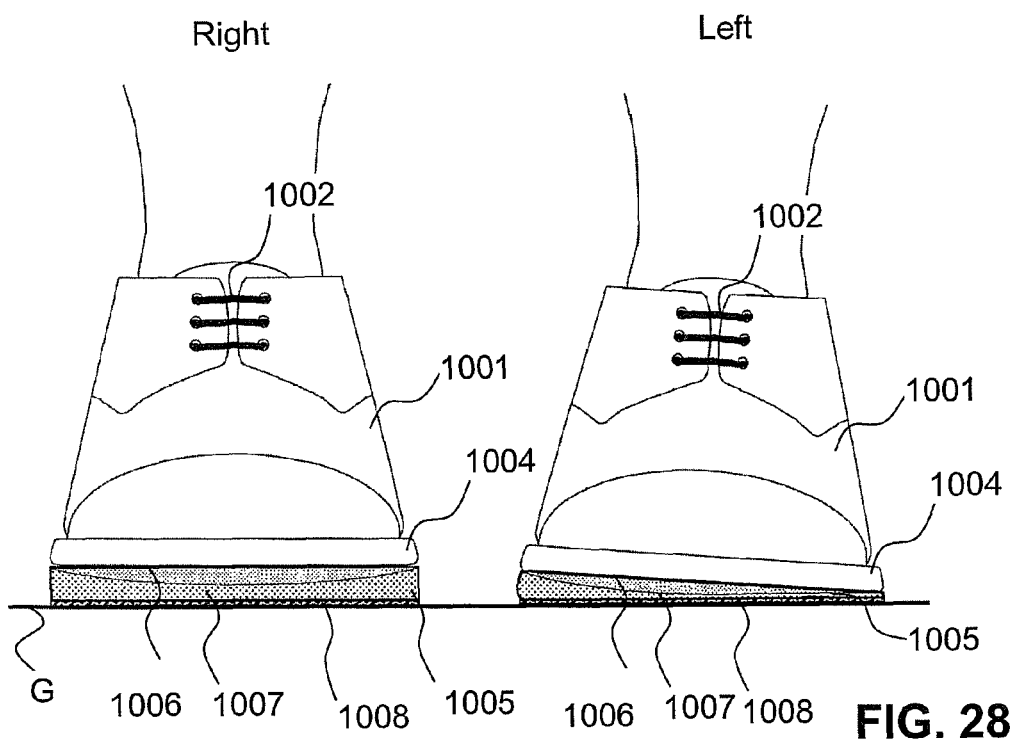
FIG. 28 shows a front view of a wearer wearing the shoe of FIG. 19.
Figure 29:
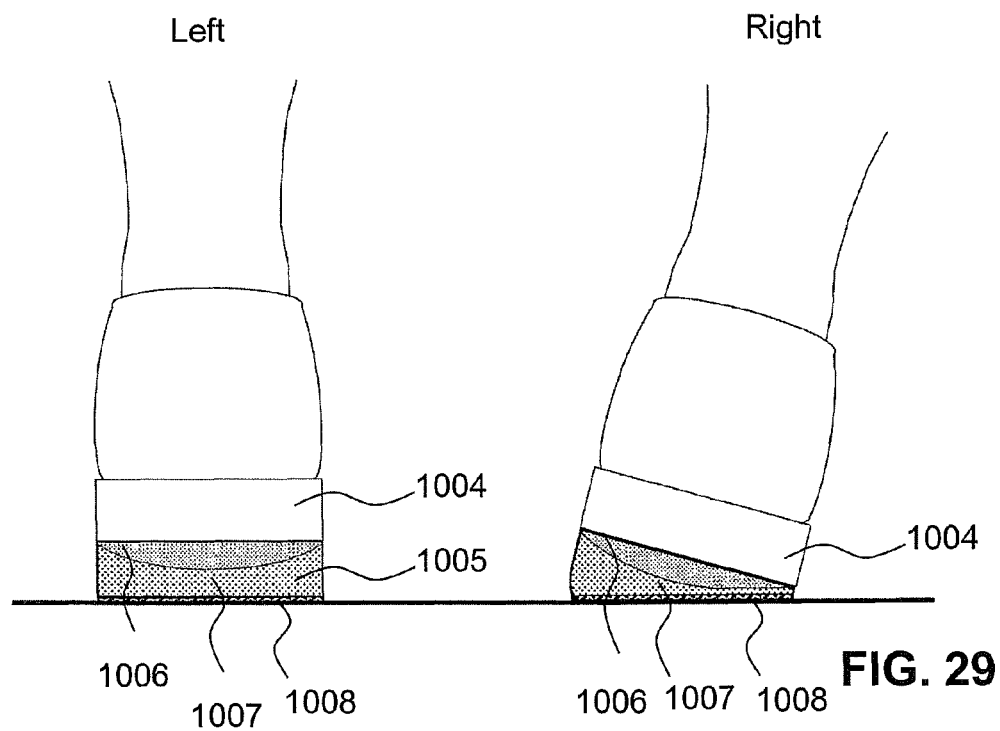
FIG. 29 shows a back view of FIG. 28.

FIGS. 28 and 29 show a pair of shoes are worn by one wearer. Thereby the wearer has a slight supination affecting the left leg or foot respectively. This means that the wearer has a bowleg and the weight of the user is supported by the anterior part of the foot. Due to the supination, the compression element 1007 will be compressed also on the anterior part. Thereby the wearer has to compensate the supination by his muscles and his coordinative abilities. As one can see from the drawings the compression element 1007 in the region of the heel 1009 is compressed to a larger degree than the one in the front region 1010.

In alternative embodiments, it is also possible that the core 1006 and the compression element 1007 are arranged such that they are integral parts of the insole 1004.

In an alternative embodiment, the compression element 1007 can comprise one or more recesses which extend preferably from the circumferential surface 1007c to the core 1006. The recesses are provided with transparent plastic having similar properties to the compression element 1007. The recesses being filled with the transparent plastic allow a view onto the core 1006 which provides the user with interesting information concerning the structure of the midsole element. The recesses can have the form of an ellipse or a rectangle.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A midsole element to be mounted to the lower surface of an insole of a shoe as a heel,
    wherein the midsole element has an upper surface adapted to be mounted on the lower surface of the insole and a lower surface, wherein the midsole element comprises a core and a resilient compression element being softer than said core,
    wherein the core has a form of a rounded cone or sphere within the resilient compression element,
    wherein the radius of the rounded cone or sphere varies in longitudinal direction and/or in lateral direction, such that the core has an elliptical form in its cross-section, allowing a pivoting movement of the upper surface of the midsole element against the lower surface of the midsole element, in, at least, an essentially transverse direction to the longitudinal axis of the midsole element in a mounted state.

2. The midsole element according to claim 1, wherein the core and the compression element are two separate parts which are connected together by means of glue.

3. The midsole element according to claim 1, wherein the core and the compression element are one single piece made by an injection-molding production method.

4. The midsole element according to claim 1, wherein the compression element of the midsole element is covered by an outer sole opposite to the upper surface of the midsole.

5. The midsole element according to claim 1, wherein the compression element will be compressed to a degree of 60% to 75% of its original volume and in that the core will be compressed to a degree of 25% to 40% of its original volume on a given load.

6. The midsole element according to claim 5, wherein the compression of the compression element and core is linear from the beginning to the end of a compression phase.

7. The midsole element according to claim 5, wherein the compression of the compression element and core is nonlinear from the beginning to the end of a compression phase.

8. The midsole element according to claim 1, wherein the resilient compression element is made of a foam material.

9. The midsole element according to claim 1, wherein the core is made of cork.

10. A midsole element to be mounted to the lower surface of an insole of a shoe under the forefoot portion, wherein the midsole element has an upper surface adapted to be mounted on the lower surface of the insole and a lower surface, wherein the midsole element comprises a core and a resilient compression element being softer than said core,
    wherein the core has the form of a rounded ridge within the resilient compression element, wherein the longitudinal axis of the rounded ridge is oriented essentially transverse to the longitudinal axis of the midsol,
    wherein the radius of the rounded ridge varies in longitudinal direction and/or in lateral direction, such that the core has an elliptical form in its cross-section, allowing a pivoting movement of the upper surface of the midsole element against the lower surface of the midsole element, in, at least, an essentially transverse direction to the longitudinal axis of the midsole in a mounted state.

11. The midsole element according to claim 10, wherein the core and the compression element are two separate parts which are connected together by means of glue.

12. The midsole element according to claim 10, wherein the core and the compression element are one single piece made by means of an injection-molding production method.

13. The midsole element according to claim 10, wherein the compression element of the midsole element is covered by an outer sole opposite to the upper surface of the midsole.

14. The midsole element according to claim 10, wherein the compression element will be compressed to a degree of 60% to 75% of its original volume and in that the core will be compressed to a degree of 25% to 40% of its original volume on a given load.

15. The midsole element according to claim 14, wherein the compression of the compression element and core is linear from the beginning to the end of a compression phase.

16. The midsole element according to claim 14, wherein the compression of the compression element and core is nonlinear from the beginning to the end of a compression phase.

17. The midsole element according to claim 10, wherein the resilient compression element is made of a foam material.

18. The midsole element according to claim 10, wherein the core is made of cork.

* * * * *